US008928697B2

(12) United States Patent
Murata et al.

(10) Patent No.: US 8,928,697 B2
(45) Date of Patent: Jan. 6, 2015

(54) DISPLAY APPARATUS, OBJECT DISPLAY METHOD, AND PROGRAM FOR DISPLAYING OBJECTS CORRESPONDING TO CHARACTERS

(75) Inventors: Makoto Murata, Tokyo (JP); Tomohiko Gotoh, Kanagawa (JP); Naoki Shibuya, Kanagawa (JP); Shunsuke Mochizuki, Tokyo (JP); Takeshi Yaeda, Tokyo (JP)

(73) Assignee: Sony Corporation, Tokyo (JP)

( * ) Notice: Subject to any disclaimer, the term of this patent is extended or adjusted under 35 U.S.C. 154(b) by 224 days.

(21) Appl. No.: 13/485,104

(22) Filed: May 31, 2012

(65) Prior Publication Data
US 2012/0313971 A1    Dec. 13, 2012

(30) Foreign Application Priority Data

Jun. 7, 2011  (JP) ................................. 2011-127390

(51) Int. Cl.
G09G 5/00       (2006.01)
H04N 21/472     (2011.01)
H04N 21/44      (2011.01)
H04N 21/84      (2011.01)
H04N 21/845     (2011.01)
G06K 9/00       (2006.01)

(52) U.S. Cl.
CPC ... *H04N 21/47217* (2013.01); *H04N 21/44008* (2013.01); *H04N 21/84* (2013.01); *H04N 21/8455* (2013.01); *H04N 21/8456* (2013.01); *G06K 9/00751* (2013.01)

USPC ......................................................... 345/660

(58) Field of Classification Search
None
See application file for complete search history.

(56) References Cited

U.S. PATENT DOCUMENTS

| | | | |
|---|---|---|---|
| 2008/0060006 A1* | 3/2008 | Shanks et al. ................... 725/38 |
| 2009/0052734 A1* | 2/2009 | Hosaka et al. ................ 382/100 |
| 2009/0279842 A1* | 11/2009 | Liao et al. ......................... 386/69 |
| 2010/0111429 A1* | 5/2010 | Wang et al. ................... 382/233 |
| 2010/0118161 A1* | 5/2010 | Tsurumi .................... 348/231.3 |
| 2011/0022982 A1* | 1/2011 | Takaoka et al. ............... 715/810 |

FOREIGN PATENT DOCUMENTS

JP    2010-277661    12/2010

* cited by examiner

*Primary Examiner* — David Zarka
*Assistant Examiner* — Khoa Vu
(74) *Attorney, Agent, or Firm* — Sherr & Jiang, PLLC

(57) ABSTRACT

There is provided a display apparatus including a relation score calculation unit calculating a relation score indicating closeness of a relation between characters based on a common appearance relation using segment metadata indicating a segment in a moving image where each of the characters appears, and an object display unit displaying an object corresponding to each of the characters appearing in the moving image. Further, the object display unit displays a pair of objects corresponding to a pair of characters with a high relation score to be closely positioned to each other, and displays a pair of objects corresponding to a pair of characters with a low relation score to be positioned far from each other.

18 Claims, 29 Drawing Sheets

[OVERVIEW OF MOVING IMAGE TIMELINE METADATA]

- REGION METADATA: POSITION (REGION) OF CHARACTER OR ARTICLE APPEARING IN MOVING IMAGE FRAME
- SEGMENT METADATA: SEGMENT WHERE CHARACTERS OR ARTICLES APPEAR
- OBJECT METADATA: INFORMATION RELATED TO CHARACTER OR ARTICLE APPEARING IN MOVING IMAGE

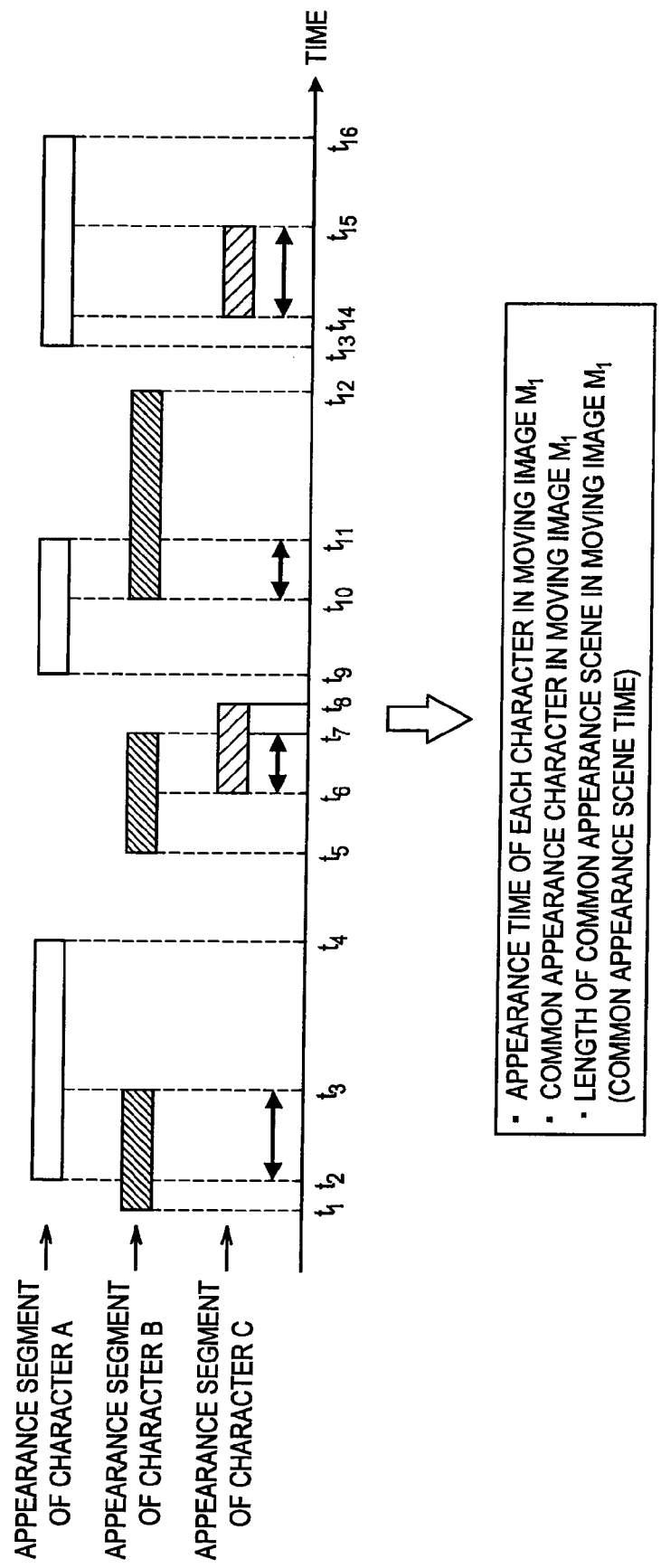

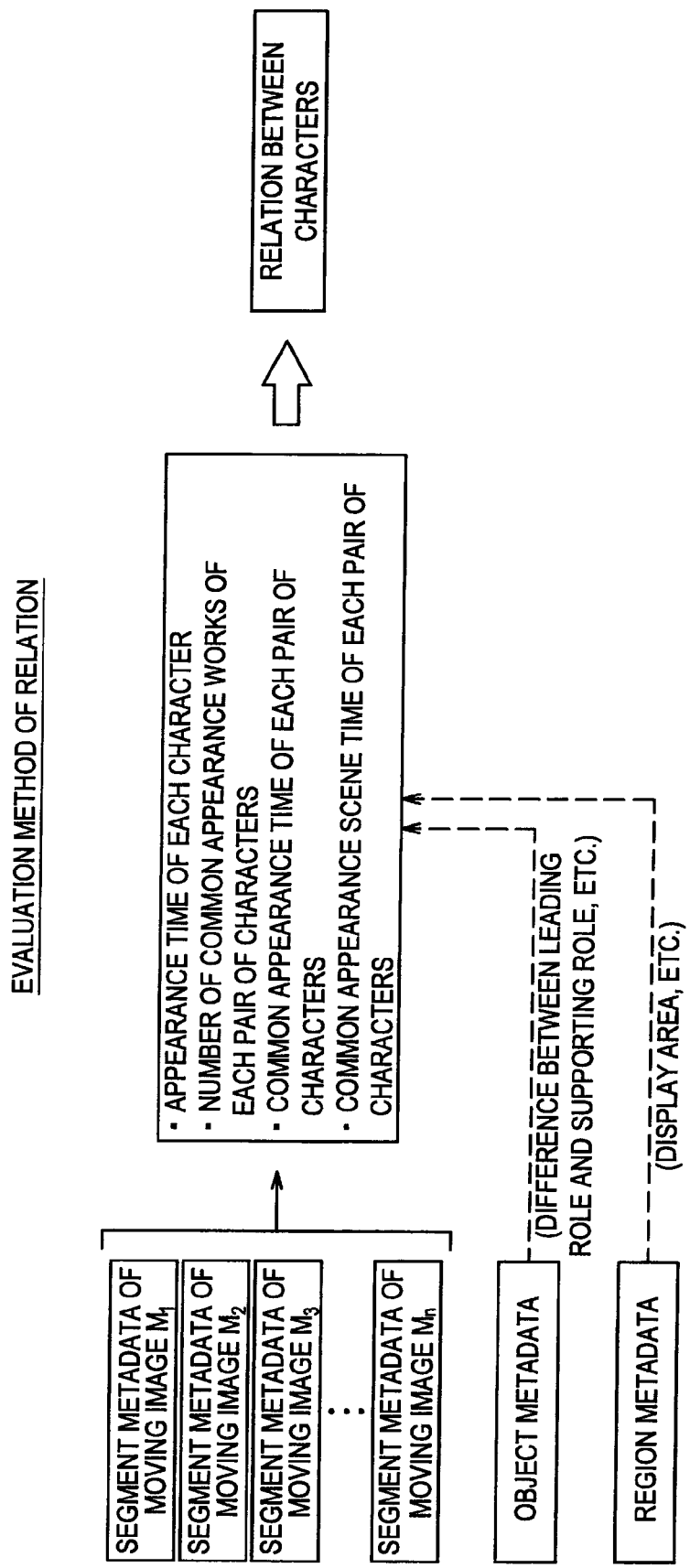

FIG. 5

STRUCTURE OF RELATION MATRIX

|  | CHARACTER A | CHARACTER B | CHARACTER C |
|---|---|---|---|
| CHARACTER A |  | RELATION VALUE OF CHARACTERS A AND B | RELATION VALUE OF CHARACTERS A AND C |
| CHARACTER B | RELATION VALUE OF CHARACTERS A AND B |  | RELATION VALUE OF CHARACTERS B AND C |
| CHARACTER C | RELATION VALUE OF CHARACTERS A AND C | RELATION VALUE OF CHARACTERS B AND C |  |

FIG. 6

METHOD OF CALCULATING RELATION MATRIX BASED ON
THE NUMBER OF COMMON APPEARANCE WORKS (COMMON APPEARANCE RELATION)
- MOVING IMAGE $M_1$ : A, B, C
- MOVING IMAGE $M_2$ : A, C
- MOVING IMAGE $M_3$ : B
- MOVING IMAGE $M_4$ : A
- MOVING IMAGE $M_5$ : A, B
- MOVING IMAGE $M_6$ : A, B

(CALCULATION RESULT OF RELATION VALUES : THE NUMBER OF COMMON APPEARANCE WORKS)

|  | CHARACTER A | CHARACTER B | CHARACTER C |
|---|---|---|---|
| CHARACTER A | (5) | 3 | 2 |
| CHARACTER B | 3 | (4) | 1 |
| CHARACTER C | 2 | 1 | (2) |

※ DIAGONAL ELEMENT INDICATES THE NUMBER OF APPEARANCE WORKS / MAJOR LEVEL OF EACH CHARACTER

FIG. 7

METHOD OF CALCULATING RELATION MATRIX (WITH WEIGHT ADDED) BASED ON THE NUMBER OF COMMON APPEARANCE WORKS (COMMON APPEARANCE RELATION)

- MOVING IMAGE $M_1$ : A(LEADING ROLE), B(LEADING ROLE), C(SUPPORTING ROLE)
- MOVING IMAGE $M_2$ : A(LEADING ROLE), C(LEADING ROLE)
- MOVING IMAGE $M_3$ : B(LEADING ROLE)
- MOVING IMAGE $M_4$ : A(SUPPORTING ROLE)
- MOVING IMAGE $M_5$ : A(SUPPORTING ROLE), B(SUPPORTING ROLE)
- MOVING IMAGE $M_6$ : A(LEADING ROLE), B(SUPPORTING ROLE)

⇩

- MOVING IMAGE OF X (LEADING ROLE) & Y (LEADING ROLE) → SCORE = 4
- MOVING IMAGE OF X (LEADING ROLE) & Y (SUPPORTING ROLE) → SCORE = 2
- MOVING IMAGE OF X (SUPPORTING ROLE) & Y (SUPPORTING ROLE) → SCORE = 1

(CALCULATION RESULT OF RELATION VALUES : SUM OF SCORES)

|  | CHARACTER A | CHARACTER B | CHARACTER C |
|---|---|---|---|
| CHARACTER A | (14) | 7 | 6 |
| CHARACTER B | 7 | (10) | 2 |
| CHARACTER C | 6 | 2 | (5) |

※1 : DIAGONAL ELEMENT INDICATES MAJOR LEVEL OF EACH CHARACTER
※2 : SQUARE ROOT OF THE SUM OF SCORES MAY BE RELATION VALUE

FIG. 8

METHOD OF CALCULATING RELATION MATRIX BASED ON APPEARANCE TIME (COMMON APPEARANCE RELATION:
NUMBERS IN PARENTHESIS REFER TO APPEARANCE TIME)

- MOVING IMAGE $M_1$ : A(40), B(30), C(10)
- MOVING IMAGE $M_2$ : A(30), C(40)
- MOVING IMAGE $M_3$ : B(20)
- MOVING IMAGE $M_4$ : A(10)
- MOVING IMAGE $M_5$ : A(5), B(10)
- MOVING IMAGE $M_6$ : A(40), B(5)

- MOVING IMAGE OF X(t1) & Y(t2) →
  SCORE = t1×t2

(CALCULATION RESULT OF RELATION VALUES : SUM OF SCORES)

|  | CHARACTER A | CHARACTER B | CHARACTER C |
|---|---|---|---|
| CHARACTER A | (2665) | 1450 | 1600 |
| CHARACTER B | 1450 | (1425) | 300 |
| CHARACTER C | 1600 | 300 | (1700) |

※1 : DIAGONAL ELEMENT INDICATES MAJOR LEVEL OF EACH CHARACTER
※2 : SQUARE ROOT OF THE SUM OF SCORES MAY BE RELATION VALUE

FIG. 9

METHOD OF CALCULATING RELATION MATRIX BASED ON APPEARANCE SCENE TIME (COMMON APPEARANCE RELATION : COMMON APPEARANCE SCENE TIME OF X AND Y IS DENOTED BY [X, Y])

- MOVING IMAGE $M_1$ : [A,A]=40, [B,B]=30, [C,C]=10, [A,B]=20, [A,C]=5, [B,C]=5
- MOVING IMAGE $M_2$ : [A,A]=30, [C,C]=40, [A,C]=20
- MOVING IMAGE $M_3$ : [B,B]=20
- MOVING IMAGE $M_4$ : [A,A]=10
- MOVING IMAGE $M_5$ : [A,A]=5, [B,B]=10, [A,B]=5
- MOVING IMAGE $M_6$ : [A,A]=40, [B,B]=5, [A,B]=5

(CALCULATION RESULT OF RELATION VALUES : SUM OF COMMON APPEARANCE SCENE TIME)

|  | CHARACTER A | CHARACTER B | CHARACTER C |
|---|---|---|---|
| CHARACTER A | (125) | 30 | 25 |
| CHARACTER B | 30 | (45) | 5 |
| CHARACTER C | 25 | 5 | 50 |

※1 : DIAGONAL ELEMENT INDICATES TOTAL APPEARANCE TIME OF EACH CHARACTER

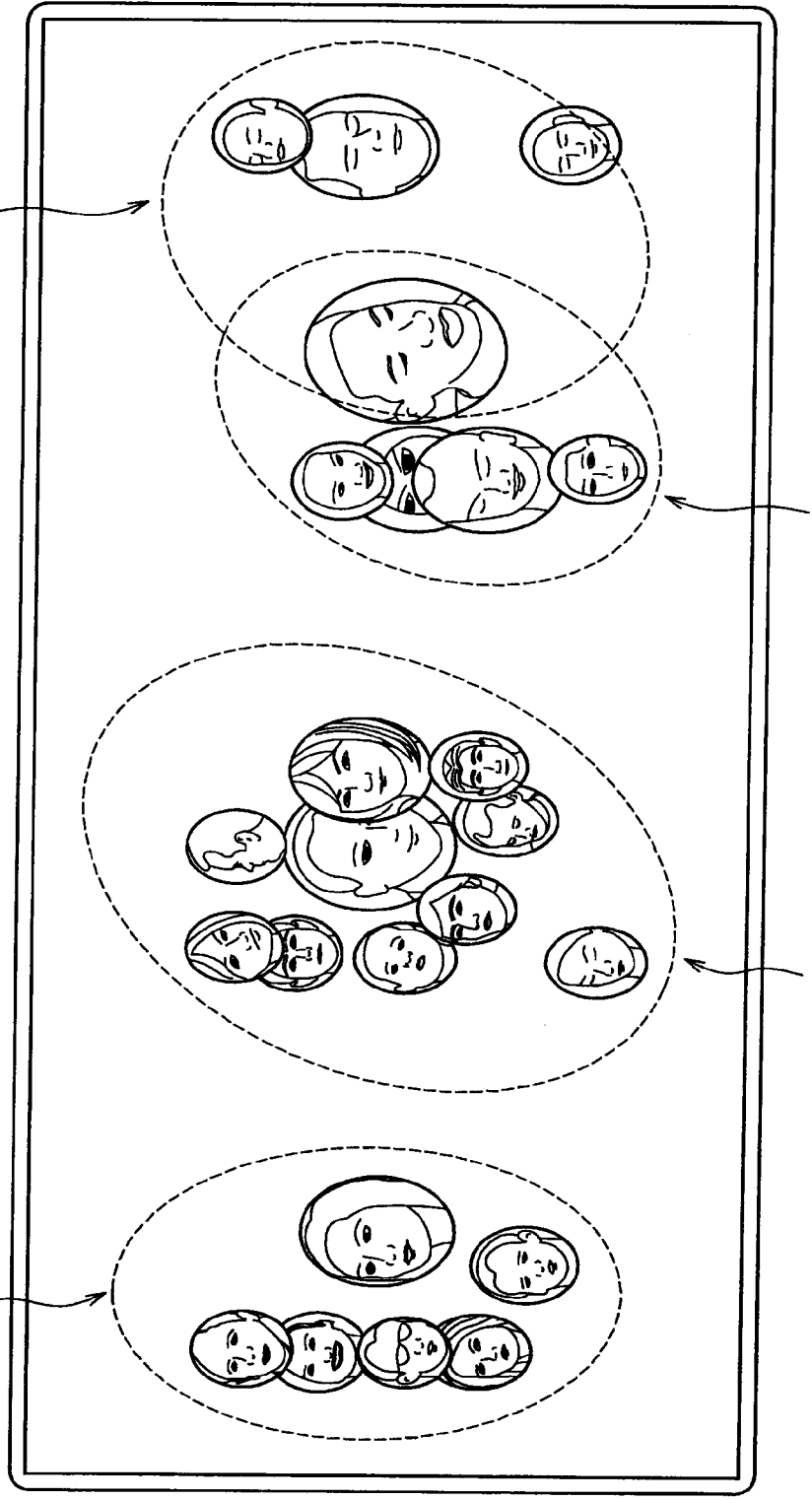

DISPLAY SIZE OF OBJECT (APPEARANCE TIME: SHORT)   (APPEARANCE TIME: LONG)

(※POSITION OF STABLE POINT IS SHIFTED TO THE LEFT AS RELATION VALUE INCREASES)

FIG. 22
REPRESENTATION OF RELATION (HERO/HEROINE)
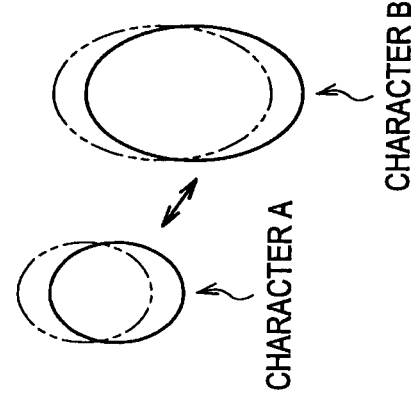
(VIBRATE AND APPROACH)
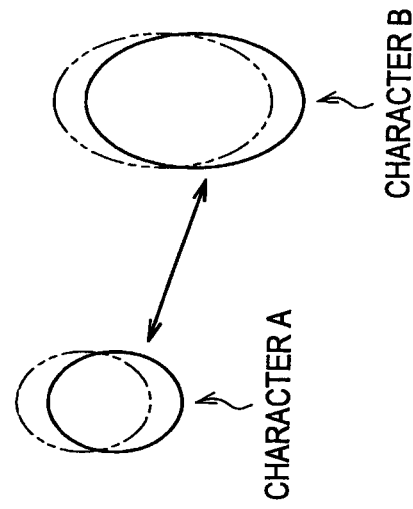
(VIBRATE AT RANDOM)

METHOD OF ARRANGING SCENE IMAGES (RANDOM ARRANGEMENT)

METHOD OF ARRANGING SCENE IMAGES (TIME-SERIES ARRANGEMENT)

APPEARANCE METHOD OF OBJECT

3D REPRESENTATION OF SCENE IMAGE

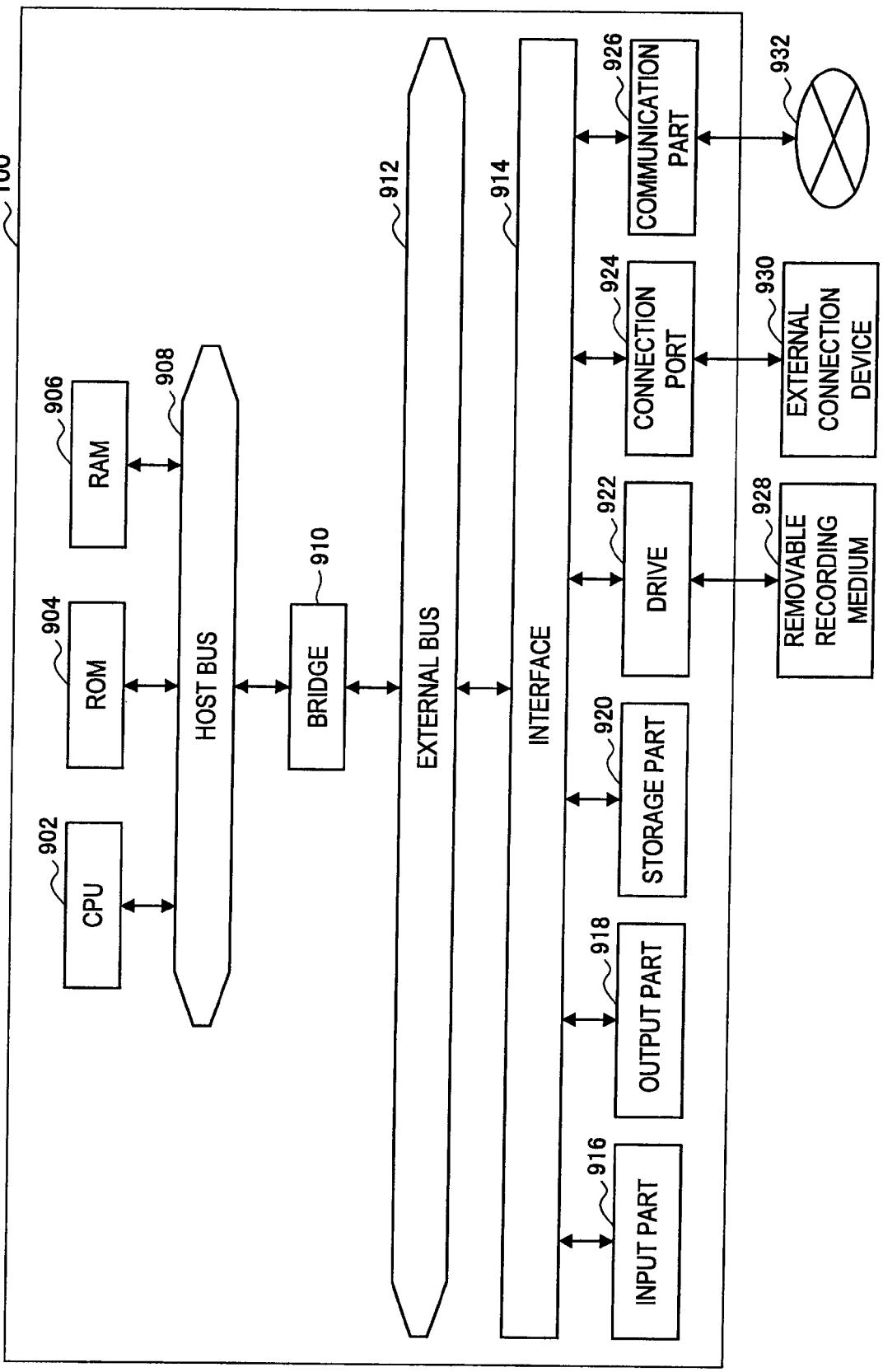

DISPLAY APPARATUS, OBJECT DISPLAY METHOD, AND PROGRAM FOR DISPLAYING OBJECTS CORRESPONDING TO CHARACTERS

BACKGROUND

The present disclosure relates to a display apparatus, an object display method, and a program.

The general public has the opportunity to view a variety of moving images, such as television images or video images. In addition, with the wide deployment of wide area networks, a sequence of moving images transmitted over the Internet (hereinafter, "streaming images") can be viewed at home. When viewing such moving images, users may use a remote control to select broadcast stations or to start replay of video images. In the case that the moving images are recorded images, DVD images, Blu-ray video images, or streaming images, the users may preset the start position of the replayed image or preset to skip a part of image scenes. For example, JP 2010-277661A discloses a technique for skipping CM with a simple operation.

SUMMARY

However, a technology for selectively replaying image scenes in which a character selected from among characters appearing in a moving image appears or for replaying another moving image where another character related to the selected character appears has not been developed. In addition, a technology for enabling users to easily recognize a relation between characters appearing in a moving image has not been developed. In view of the foregoing, the present technology is conceived to provide a new and improved display apparatus, object display method, and program, capable of enabling users to easily recognize a relation between characters appearing in one or more moving images.

According to an embodiment of the present disclosure, there is provided a display apparatus including: a relation score calculation unit calculating a relation score indicating closeness of a relation between characters based on a common appearance relation using segment metadata indicating a segment in a moving image where each of the characters appears; and an object display unit displaying an object corresponding to each of the characters appearing in the moving image. Further, the object display unit displays a pair of objects corresponding to a pair of characters with a high relation score to be closely positioned to each other, and displays a pair of objects corresponding to a pair of characters with a low relation score to be positioned far from each other.

According to another embodiment of the present disclosure, there is provided a method of displaying an object, the method including: calculating a relation score indicating closeness of a relation between characters based on a common appearance relation using segment metadata indicating a segment in a moving image where each of the characters appears; and displaying an object corresponding to each of the characters appearing in the moving image. Further, a pair of objects corresponding to a pair of characters with a high relation score is displayed to be closely positioned to each other, and a pair of objects corresponding to a pair of characters with a low relation score is displayed to be positioned far from each other.

According to another embodiment of the present disclosure, there is provided a program for causing a computer to realize a function of calculating a relation score indicating closeness of a relation between characters based on a common appearance relation using segment metadata indicating a segment in a moving image where each of the characters appears, and a function of displaying an object corresponding to each of the characters appearing in the moving image. Further, the function of display an object includes displaying a pair of objects corresponding to a pair of characters with a high relation score to be closely positioned to each other, and displaying a pair of objects corresponding to a pair of characters with a low relation score to be positioned far from each other.

According to another embodiment of the present disclosure, there is provided a computer-readable recording medium having the program recorded thereon.

As described above, the present technology enables users to easily recognize a relation between characters appearing in one or more moving images.

BRIEF DESCRIPTION OF THE DRAWINGS

FIG. 3 is a view illustrating a structure of segment metadata and information detected using the segment metadata according to an exemplary embodiment of the present disclosure;

FIG. 4 is a view illustrating a method of evaluating a relation according to an exemplary embodiment of the present disclosure;

FIG. 5 is a view illustrating a structure of a relation matrix according to an exemplary embodiment of the present disclosure;

FIG. 6 is a view illustrating a method of calculating a relation matrix according to an exemplary embodiment of the present disclosure;

FIG. 7 is a view illustrating a method of calculating a relation matrix according to an exemplary embodiment of the present disclosure;

FIG. 8 is a view illustrating a method of calculating a relation matrix according to an exemplary embodiment of the present disclosure;

FIG. 9 is a view illustrating a method of calculating a relation matrix according to an exemplary embodiment of the present disclosure;

FIG. 10 is a view illustrating a method of displaying an object according to an exemplary embodiment of the present disclosure;

FIG. 22 is a view illustrating a method of displaying an object according to an exemplary embodiment of the present disclosure;

FIG. 35 is a block diagram illustrating a hardware structure of an information processing apparatus according to an exemplary embodiment of the present disclosure.

DETAILED DESCRIPTION OF THE EMBODIMENT(S)

Figure 1:
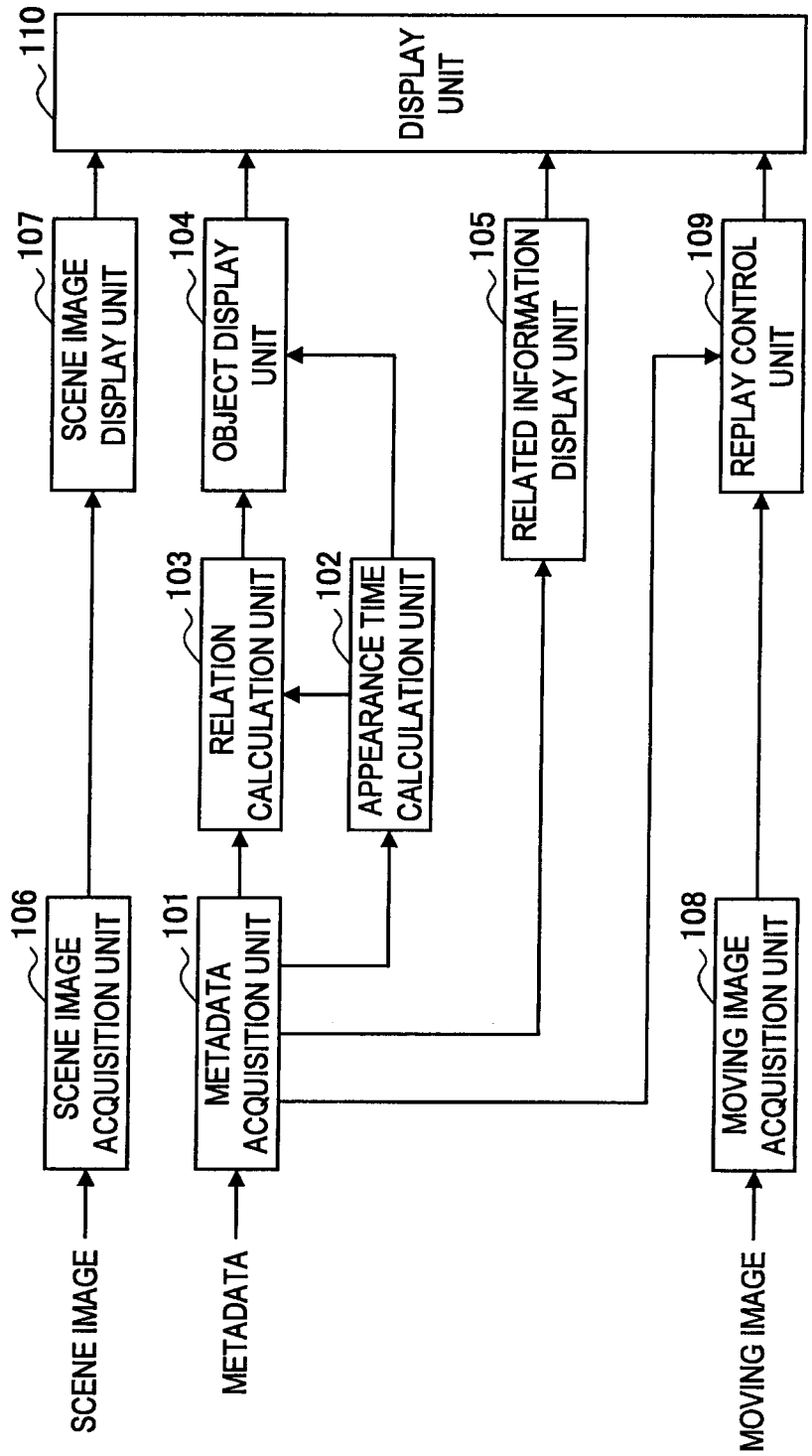
FIG. 1 is a block diagram illustrating a functional structure of an information processing apparatus according to an exemplary embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

[Flow of Description]

The flow of description of the following embodiments of the present disclosure will be briefly provided.

A structure of an information processing apparatus 100 according to an exemplary embodiment of the present disclosure will be first described with reference to FIG. 1. Next, a structure of moving image timeline metadata according to an exemplary embodiment of the present disclosure will be described with reference to FIG. 2. Next, a method of calculating a relation value according to an exemplary embodiment of the present disclosure will be described with reference to FIGS. 3 to 9. Next, a method of displaying an object using a relation value according to an exemplary embodiment of the present disclosure will be described with reference to FIGS. 10 to 24.

Next, a method of displaying a scene image according to an exemplary embodiment of the present disclosure will be described with reference to FIGS. 25-32. Next, a method of displaying related information according to an exemplary embodiment of the present disclosure will be described with reference to FIG. 33. Next, a method of displaying a moving image replay screen and a method of replaying a moving image according to an exemplary embodiment of the present disclosure will be described with reference to FIG. 34. Next, a hardware structure configured to implement a function of an information processing apparatus 100 according to an exemplary embodiment of the present disclosure will be described with reference to FIG. 35. Finally, the technical ideas of the exemplary embodiments of the present disclosure will be reviewed and the effects obtained from the technical ideas will be briefly described.

<Contents>

1: Embodiments 1-1: Structure of information processing apparatus 100

1-2: Method of calculating relation values 1-2-1: Method of evaluating common appearance relations based on segment metadata 1-2-2: Method of calculating relation values based on the number of common appearance works 1-2-3: Method of calculating relation values based on the number of common appearance works (with weight added)

1-2-4: Method of calculating relation values based on appearance time 1-2-5: Method of calculating relation values based on appearance scene time 1-3: Method of displaying objects 1-3-1: Size of object 1-3-2: Distance between objects 1-3-3: Representation of depth 1-3-4: Representation of relation 1-4: Method of displaying of scene images 1-4-1: Method of arranging scene images (random arrangement)

1-4-2: Method of arranging scene images (time-series arrangement)

1-4-3: Method of arranging scene images (mood-based arrangement)

1-5: Changes of scene image display and object display 1-5-1: Change of periods 1-5-2: Change of regions 1-5-3: Display of objects upon change 1-6: Other display methods
    1-6-1: Three-dimensional (3D) display
    1-6-2: Display of related information
    1-6-3: Display of moving image replay screens
2: Structure of hardware
3: Review 1: Embodiments Exemplary embodiments of the present disclosure will be described. The exemplary embodiment relates to a technique for extracting a relation between characters appearing in a moving image and enabling users to easily recognize the relation and the closeness of the relation. Further, the exemplary embodiment relates to a technique for providing a user interface for observing a relation between a predetermined character and a moving image. In addition, the exemplary embodiment relates to a technique for providing a user interface for selectively replaying image scenes in which a predetermined character appears or for displaying information related to the predetermined character. Hereinafter, the techniques will be described in detail.

[1-1: Structure of Information Processing Apparatus 100]

The structure of an information processing apparatus 100 according to an exemplary embodiment of the present disclosure will be described with reference to FIG. 1. FIG. 1 is a block diagram illustrating the structure of an information processing apparatus 100 according to an exemplary embodiment of the present disclosure.

(General Structure)

As shown in FIG. 1, the information processing apparatus 100 includes a metadata acquisition unit 101, an appearance time calculation unit 102, a relation calculation unit 103, an object display unit 104, a related information display unit 105, a scene image acquisition unit 106, a scene image display unit 107, a moving image acquisition unit 108, a replay control unit 109, and a display unit 110. The display unit 110 may be a separate entity. In this case, the information processing apparatus 100 serves as a display control unit configured to display images on the display unit 110 by means of signal lines or networks. Further, the moving image acquisition unit 108 and the replay control unit 109 may be a separate entity.

(Configuration for Object Display)

The metadata acquisition unit 101 acquires moving image timeline metadata. For example, the metadata acquisition unit 101 acquires moving image timeline metadata from a storage unit connected therewith through a signal line or a network or from a metadata supply system connected therewith through a network. Examples of the storage unit may include a device to read data recorded on a recording medium, such as a magnetic recording medium, an optical recording medium, a magneto-optical recording medium, or a semiconductor memory, or a device to read and write data from and into these recording media. The metadata acquisition unit 101 may acquire the moving image timeline metadata beforehand or at a predetermined timing which is preset by a user for a moving image of interest to be replayed.

Figure 2:
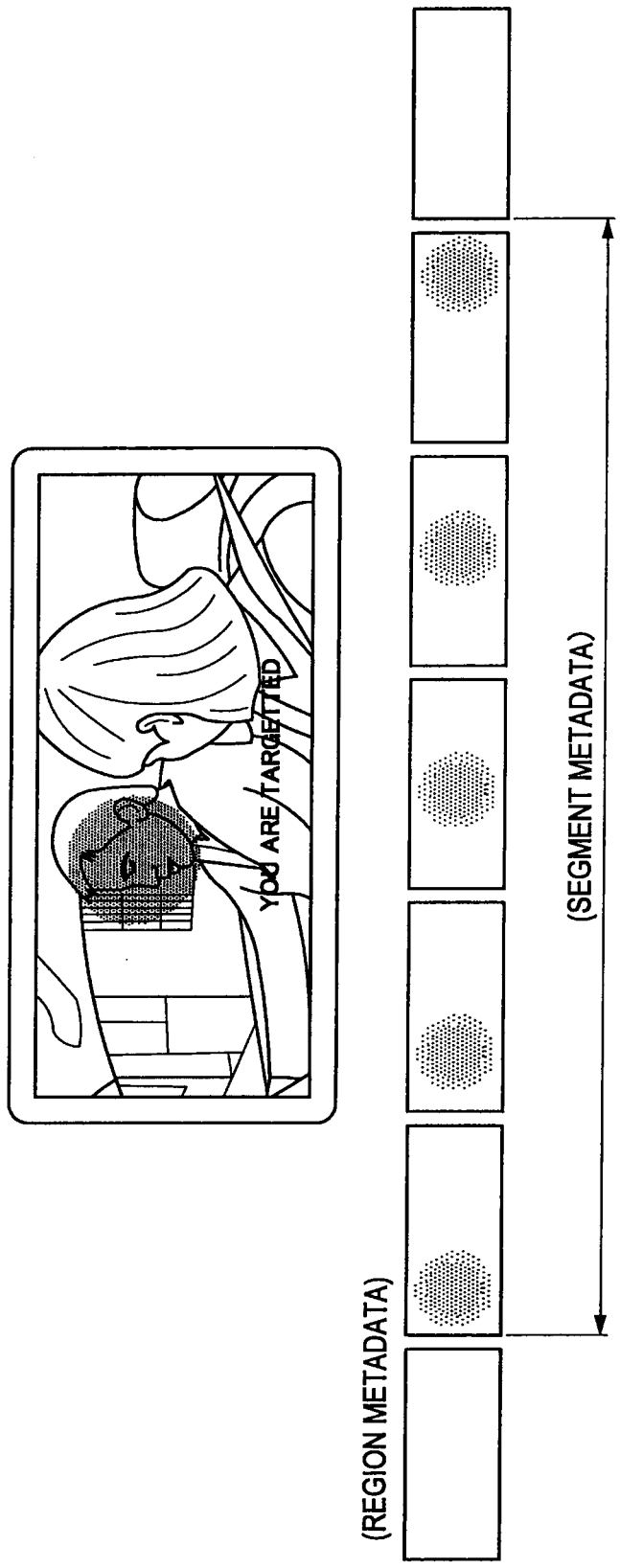
FIG. 2 is a view illustrating a structure of moving image timeline metadata according to an exemplary embodiment of the present disclosure.

As shown in FIG. 2, the moving image timeline metadata includes region metadata, segment metadata, and object metadata. The region metadata indicates the position or range of a character or an article appearing in a moving image frame. FIG. 2 illustrates a region metadata indicating a face portion of a character appearing in a moving image frame. The segment metadata indicates a segment where a character or an article appears in a moving image. The object metadata indicates information related to a character or an article appearing in a moving image.

The moving image timeline metadata is set for each character or each article appearing in a moving image. Further, the moving image timeline metadata is set for each moving image. Accordingly, by using the segment metadata of the moving image timeline metadata, it is possible to determine which segment of a moving image a character appears in. Further, by using the region metadata, it is possible to determine a correspondence between an area on a screen designated by a user and a character or an article displayed on the screen. For example, if a face portion of a character is designated by a user, it is possible to implement a user interface for displaying information related to the character by using the region metadata and the object metadata.

Referring back to FIG. 1, the moving image timeline metadata acquired by the metadata acquisition unit 101 is input to the appearance time calculation unit 102, the relation calculation unit 103, the related information display unit 105, and the replay control unit 109. For example, the segment metadata is input to the appearance time calculation unit 102, the relation calculation unit 103 and the replay control unit 109. Further, the region metadata and the object metadata are input to the related information display unit 105. In addition, the region metadata may be input to the relation calculation unit 103 and the replay control unit 109.

If the segment metadata is input, the appearance time calculation unit 102 calculates the appearance time of each character in each moving image (hereinafter "appearance time in each moving image") using the segment metadata. The segment metadata includes the appearance start time and the appearance end time of each segment where the character appears. In this case, by obtaining the sum of lengths of each appearance segment in one moving image, the appearance time in each moving image may be calculated for the moving image. The appearance time calculation unit 102 calculates the total appearance time of each character by obtaining the sum of the appearance time in each moving image of interest.

The information on the appearance time in each moving image calculated by the appearance time calculation unit 102 is input to the relation calculation unit 103. The information on the total appearance time calculated by the appearance time calculation unit 102 is input to the object display unit 104. If the segment metadata and the information on the appearance time in each moving image are input, the relation calculation unit 103 calculates a relation value indicating the relation between characters using the segment metadata and the appearance time in each moving image. The relation value is a score indicating a relation and a closeness of the relation. A method of calculating the relation value will be described.

The relation value calculated by the relation calculation unit 103 is input to the object display unit 104. If the information on the total appearance time and the relation value are input, the object display unit 104 displays an object representing a character on the display unit 110. In this case, the object display unit 104 adjusts the size of the object based on the information on the total appearance time and adjusts the arrangement of each object based on the relation value. A method of displaying the object based on the information on the total appearance time and the relation value will be described. The object display unit 104 controls the object display when operation of changing the display position of the object, operation of designating the object, or the following operation of changing a scene image is performed.

(Configuration for Displaying Related Information)

The region metadata and the object metadata are input to the related information display unit 105. If the region metadata and the object metadata are input, the related information display unit 105 displays related information on the display unit 110 using the region metadata and the object metadata. For example, if an object is selected, the related information display unit 105 displays information related to a character or an article which corresponds to the selected object. Further, if an area on a screen is selected during playing a moving image, the related information display unit 105 uses the region metadata to detect a character or an article which corresponds to the selected area. The related information display unit 105 displays information related to the detected character or article. In addition, a method of displaying the related information will be described in detail.

(Configuration for Displaying Scene Images)

The scene image acquisition unit 106 acquires a scene image representing one scene of a moving image. For example, the scene image acquisition unit 106 acquires a moving image or a scene image from a storage unit connected therewith through a signal line or a network or from a moving image transmission system connected therewith through a network. Examples of the storage unit may include a device to read data recorded on a recording medium, such as a magnetic recording medium, an optical recording medium, a magneto-optical recording medium, or a semiconductor memory, or a device to read and write data from and into these recording media. The scene image acquisition unit 106 may acquire a moving image or a scene image beforehand or at a predetermined timing which is preset by a user for a moving image of interest to be replayed.

The scene image acquisition unit 106 may use a single image extracted from a moving image as a scene image, or use a predetermined scene image. A moving image may be replayed as a scene image. For example, the scene image acquisition unit 106 may use an image of a moving image frame, which is positioned at the head of the moving image, as a scene image, or may use a package of pictures of a moving image as a scene image. The scene image acquisition unit 106 acquires one or more scene images from a single moving image. The scene image acquired by the scene image acquisition unit 106 is input to the scene image display unit 107.

If a scene image is input, the scene image display unit 107 displays the scene image on the display unit 110. In this case, the scene image display unit 107 displays a plurality of scene images side by side in a tiled manner. The scene image display unit 107 arranges the scene images based on a predetermined arrangement rule. For example, the scene image display unit 107 may arrange the scene images at random or based on information on the type or time of the moving image. Further, if operation of changing the scene image is performed, the scene image display unit 107 changes the scene image based on the change operation. A method of display the scene image will be described.

(Configuration for Replay Control of a Moving Image)

The moving image acquisition unit 108 acquires a moving image from a storage unit connected therewith through a signal line or a network or from a moving image transmission system connected therewith through a network. Examples of the storage unit may include a device to read data recorded on a recording medium, such as a magnetic recording medium, an optical recording medium, a magneto-optical recording medium, or a semiconductor memory, or a device to read and write data from and into these recording media. Further, the moving image acquisition unit 108 may acquire a moving image beforehand or at a predetermined timing which is preset by a user for the moving image of interest to be replayed. The moving image acquired by the moving image acquisition unit 108 is input to the replay control unit 108.

If a moving image is input, the replay control unit 109 replays the moving image and displays the moving image on the display unit 110. For example, if an object is selected, the replay control unit 109 uses segment metadata input by the metadata acquisition unit 101 to designate a segment where a character corresponding to the selected object appears. The replay control unit 109 selectively replays the designated segment. Further, if a character is selected during replaying a moving image, the replay control unit 109 uses segment metadata to selectively replay a segment where the selected character appears. Further, the replay control unit 109 may use segment metadata to display an appearance scene of a character appearing during replaying of a moving image or to replay a selected appearance scene.

The structure of the information processing apparatus 100 according to an exemplary embodiment of the present disclosure has been described above.

[1-2: Method of Calculating Relation Values]

A method of calculating a relation value according to an exemplary embodiment of the present disclosure will be described with reference to FIGS. 3 to 9. The calculation of the relation value is mainly implemented by the relation calculation unit 103.

(1-2-1: Method of Evaluating Common Appearance Relations Based on Segment Metadata)

A method of evaluating a common appearance relation based on segment metadata will be described with reference to FIGS. 3 to 5. Specifically, the type of main information obtained from segment metadata and the evaluation basis for evaluating a relation between characters will be described. FIGS. 3 to 5 are views illustrating a method of evaluating a common appearance relation based on segment metadata.

Referring to FIG. 3, the segment metadata is prepared for each moving image and each character as described above. Each segment metadata indicates a segment of a moving image where a character appears. FIG. 3 illustrates segment metadata indicating appearance segments of a character A, segment metadata indicating appearance segments of a character B, and segment metadata indicating appearance segments of a character C in a moving image $M_1$. In FIG. 3, appearance segments of $t_2 \sim t_4$, $t_9 \sim t_{11}$, and $t_{13} \sim t_{16}$ are for the character A; appearance segments of $t_1 \sim t_3$, $t_5 \sim t_7$, and $t_{10} \sim t_{12}$ are for the character B; and appearance segments of $t_6 \sim t_8$ and $t_{14} \sim t_{15}$ are for the character C.

From the three segment metadata in FIG. 3, the appearance time of each character appearing in the moving image $M_1$ (appearance time in each moving image), the common characters appearing in the moving image $M_1$, and the length of the common appearance scene in the moving image $M_1$ (hereinafter, common appearance scene time) may be obtained. For example, the appearance time in each moving image of the character A appearing in the moving image $M_1$, $\Delta t_{1A}$, is $\Delta t_{1A} = |t_4 - t_2| + |t_{11} - t_9| + |t_{16} - t_{31}|$. The appearance time in each moving image of the character B appearing in the moving image $M_1$, $\Delta t_{1B}$, and the appearance time in each moving image of the character C appearing in the moving image $M_1$, $\Delta t_{1C}$, are similarly obtained. Since the appearance segments of the characters A, B and C are present in the moving image $M_1$, it can be seen that the characters A and B are common appearance characters, the characters B and C are common appearance characters, and the characters C and A are common appearance characters.

Further, since the characters A and B are commonly appearing in the segments $t_2 \sim t_3$ and $t_{10} \sim t_{11}$, the common appearance scene time of the characters A and B appearing in the moving image $M_1$, $\Delta t_{1AB}$, is $\Delta t_{1AB}=|t_3-t_2|+|t_{11}-t_{10}|$. Similarly, since the characters B and C are commonly appearing in the segment $t_6$~$t_7$, the common appearance scene time of the characters B and C appearing in the moving image $M_1$, $\Delta t_{1BC}$, is $\Delta t_{1BC}=|t_7-t_6|$. Similarly, since the characters A and C are commonly appearing in the segments $t_{14}$~$t_{15}$, the common appearance scene time of the characters A and C appearing in the moving image $M_1$, $\Delta t_{1CA}$, is $\Delta t_{1CA}=t_{15}-t_{14}|$.

Accordingly, by analyzing the segment metadata of each moving image, the appearance time in each moving image of each character appearing in each moving image, the common appearance characters appearing in each moving image, and the common appearance scene time in each moving image may be obtained. Further, as shown in FIG. 4, from a combination of the appearance time in each moving image, the common appearance characters in each moving image, and the common appearance scene time in each moving image, the total appearance time of each character, the number of common appearance works for each pair of characters, the total common appearance time for each pair of characters, and the total common appearance scene time for each pair of characters may be obtained for a group of moving images of interest ($M_1$~$M_n$ in FIG. 4).

For example, from a sum of the appearance time in each moving image of the same character appearing in a group of moving images of interest, the total appearance time of the character may be obtained. Further, since common appearance characters appearing in each moving image are known, the number of common appearance works of a pair of characters may be obtained by calculating the number of moving images where the pair of characters is commonly appearing. Further, by obtaining the sum of appearance time in each moving image of each of characters appearing in a group of moving images where a pair of the characters is commonly appearing, the common appearance time of the pair of characters commonly appearing in the group of moving images may be obtained. Further, by obtaining the sum of common appearance scene time of a pair of characters commonly appearing in a group of moving images, the common appearance scene time of the pair of characters commonly appearing in the group of moving images may be obtained.

For example, it is assumed that characters D and E are commonly appearing in moving images $M_2$ and $M_5$. In this case, the common appearance time of a pair of the characters D and E is equal to the sum of appearance time of the character D appearing in the moving images $M_2$ and $M_5$, i.e., $\Delta t_{2D}$ and $\Delta t_{5D}$, and the sum of appearance time of the character E appearing in the moving images $M_2$ and $M_5$, i.e., $\Delta t_{2E}$ and $\Delta t_{5E}$, (i.e., $\Delta t_{2D}+\Delta t_{5D}+\Delta t_{2E}+\Delta t_{5E}$). Further, the common appearance scene time of the pair of the characters D and E is equal to the sum of common appearance scene time in the moving image $M_2$, i.e., $\Delta t_{2DE}$, and common appearance scene time in the moving image $M_5$, i.e., $\Delta t_{5DE}$, (i.e., $\Delta t_{2DE}+\Delta t_{5DE}$).

A pair of characters with a number of common appearance works, a pair of characters with a long common appearance time, or a pair of characters with a long common appearance scene time may be considered a pair of characters with a close relation between the characters. Further, as characters play a leading role in more common appearance works, the characters may be considered as having a closer relation. Further, it may be preferable that the relation between characters is evaluated in terms of a displayed area. If the displayed area is not considered, for example, it may be considered that a character playing as an extra and a character playing a leading actor have a closer relation while a leading actor and a leading actress do not have a close relation. Information on the leading role or supporting role may be obtained from the object metadata. The displayed area may be obtained from the region metadata.

As described above, a variety of information for evaluating the relation between characters may be obtained using the segment metadata. The relation between characters may be evaluated using the information. Further, the relation between characters may be more properly evaluated by additionally using the object metadata or the region metadata. For example, as shown in FIG. 5, the relation between characters may be represented in matrix form. Each element of the matrix includes a relation value indicating the closeness of a relation in a pair of characters corresponding to the element. This matrix is referred to as a relation matrix. A method of calculating the relation value will be described in detail.

(1-2-2: Method of Calculating Relation Values Based on the Number of Common Appearance Works)

A method of calculating a relation value based on the number of common appearance works will be described with reference to FIG. 6. FIG. 6 is a view illustrating a method of calculating a relation value based on the number of common appearance works. In this case, a group of moving images of interest is moving images $M_1$~$M_6$ where characters A, B and C are appearing.

As described above, as shown in FIG. 6, a common appearance relation between the characters A, B and C may be obtained using the segment metadata. In FIG. 6, the characters A, B and C are appearing in the moving image $M_1$; the characters A and C are appearing in the moving image $M_2$; the character B is appearing in the moving image $M_3$; the character A is appearing in the moving image $M_4$; the characters A and B are appearing in the moving image $M_5$; and the characters A and B are appearing in the moving image $M_{16}$. That is, the characters A and B are commonly appearing in the moving images $M_1$, $M_5$ and $M_6$; the characters A and C are commonly appearing in the moving images $M_1$ and $M_2$; and the characters B and C are commonly appearing only in the moving image $M_1$.

The characters A and B are commonly appearing in three (3) works, the characters A and C are commonly appearing in two (2) works, and the characters B and C are commonly appearing in one (1) work. Accordingly, a relation value indicating a relation between the characters A and B is three (3), a relation value between the characters A and C is two (2), and a relation value between the characters B and C is one (1). Further, a relation value of the same person may be formally calculated. For example, works in which the character A and the character A are commonly appearing are identical to works in which the character A is appearing. In this case, the works of the character A are the moving images $M_1$, $M_2$ and $M_4$~$M_6$. That is, the number of works in which the character A and the character A are commonly appearing is equal to five (5). Therefore, a relation value indicating a relation between the character A and the character A is five (5). This is the same with the character B or the character C.

From the relation values, including relation values for the same characters, obtained from the foregoing, a relation matrix may be obtained as shown in FIG. 6. In the relation matrix, each diagonal element indicates the number of works in which each character corresponding to each diagonal element appears. Further, since a character appearing in a number of works may be considered as having a high major level, it may be considered that the diagonal element of the relation matrix indicates a major level. Although the number of appearance works has been used as the relation value, a processed value, such as a value multiplied by a predetermined coefficient or a normalized value, may be considered a relation value.

The method of calculating relations based on the number of common appearance works has been described above.

(1-2-3: Method of Calculating Relation Values Based on the Number of Common Appearance Works (with Weight Added))

Next, a method of calculating a relation value (with weight added) based on the number of common appearance works will be described with reference to FIG. 7. FIG. 7 is a view illustrating a method of calculating a relation value (with weight added) based on the number of common appearance works according to an exemplary embodiment of the present disclosure. Specifically, a method of calculating a relation value based on a weight value and the number of common appearance works will be described. In this case, the weight value is used to indicate a difference between a character plying a leading role and a character playing a supporting role. It is assumed that a group of moving images of interest includes moving images $M_1 \sim M_6$ where the characters A, B and C are appearing.

As shown in FIG. 7, a common appearance relation between the characters A, B and C may be obtained using the segment metadata. In FIG. 7, the characters A, B and C are commonly appearing in the moving image $M_1$; the characters A and C are commonly appearing in the moving image $M_2$; only the character B is appearing in the moving image $M_3$; only the character A is appearing in the moving image $M_4$; the characters A and B are commonly appearing in the moving image $M_5$; and the characters A and B are commonly appearing in the moving image $M_6$. That is, the characters A and B are commonly appearing in the moving images $M_1$, $M_5$ and $M_6$; the characters A and C are commonly appearing in the moving images $M_1$ and $M_2$; and the characters B and C are commonly appearing only in the moving image $M_1$.

Further, it can be seen from the object metadata that the characters A and B play a leading role and the character C plays a supporting role in the moving image $M_1$; the character A plays a leading role and the character C plays a supporting role in the moving image $M_2$; the character B plays a leading role in the moving image $M_3$; the character A plays a supporting role in the moving image $M_4$; the characters A and B play a supporting role in the moving image $M_5$; and the character A plays a leading role and the character B plays a supporting role in the moving image $M_6$.

The weight will now be described. It is assumed that one common appearance work is assigned a score of four (4) if all of the characters play a leading role; one common appearance work is assigned a score of two (2) if a part of the characters play a leading role and the other part play a supporting role; and one common appearance work is assigned a score of one (1) if all of the characters play a supporting role.

In FIG. 7, the moving image $M_1$ is a work where the characters A and B play a leading role; the moving image $M_6$ is a work where the character A plays a leading role and the character B plays a supporting role or vice versa; and the moving image $M_5$ is a work where the characters A and B play a supporting role. Accordingly, for a pair of the characters A and B, the number of works where the characters A and B play a leading role is one (1); the number of works where the character A plays a leading role and the character B plays a supporting role or vice versa is one (1); and the number of works where the characters A and B play a supporting role is one (1). As a result, the sum of scores is $4\times1+2\times1+1\times1=7$. That is, the relation value indicating the relation between the characters A and B is seven (7).

Similarly, the moving image $M_2$ is a work where the characters A and C play a leading role; the moving image $M_1$ is a work where the character A plays a leading role and the character C plays a supporting role or vice versa; and there is no work where the characters A and C play a supporting role. Accordingly, for a pair of the characters A and C, the number of works where the characters A and C play a leading role is one (1); the number of works where the character A plays a leading role and the character C plays a supporting role or vice versa is one (1); and the number of works where the characters A and C play a supporting role is zero (0). As a result, the sum of scores is $4\times1+2\times1+1\times0=6$. That is, the relation value indicating the relation between the characters A and C is six (6).

Similarly, there is no work where the characters B and C play a leading role; the moving image $M_1$ is a work where the character B plays a leading role and the character C plays a supporting role or vice versa; and there is no work where the characters B and C play a supporting role. Accordingly, for a pair of the characters B and C, the number of works where the characters B and C play a leading role is zero (0); the number of works where the character B plays a leading role and the character C plays a supporting role or vice versa is one (1); and the number of works where the characters B and C play a supporting role is zero (0). As a result, the sum of scores is $4\times0+2\times1+1\times0=2$. That is, the relation value indicating the relation between the characters B and C is two (2).

Similarly, relation values of the same characters may also be obtained in the same manner as above. As a result, the relation matrix shown in FIG. 7 may be obtained from the above-mentioned relation values. In the relation matrix, each diagonal element indicates a major level of each character corresponding to each diagonal element. Although the sum of scores has been used as the relation value, the square root of the sum of scores may be a relation value. Further, although the relation value has been obtained from the score determined according to a combination of roles, for example, a relation value Rel may be obtained based on the following equation 1, where role weight $RW(M_k, A)$ is two (2) if the character A plays a leading role in the moving image $M_k$, one (1) if the character A plays a supporting role in the moving image $M_k$, and zero (0) if the character A does not appear in the moving image $M_k$. Further, $\text{Rel}(A, B)$ indicates a relation value indicating the relation between the characters A and B.

$$\text{Rel}(A, B) = \sqrt{\sum_k \{RW(M_k, A) \cdot RW(M_k, B)\}} \quad (1)$$

The method of calculating the relation (with weight added) based on the number of common appearance works has been described above.

(1-2-4: Method of Calculating Relation Values Based on Appearance Time)

Next, a method of calculating a relation value based on appearance time will be described with reference to FIG. 8. FIG. 8 is a view illustrating a method of calculating a relation value based on appearance time. Specifically, a method of calculating a relation value using appearance time of each character in each moving image will be described. In this case, a group of moving images of interest is moving images $M_1 \sim M_6$ in which the characters A, B and C are appearing.

As shown in FIG. 8, a common appearance relation between the characters A, B and C may be obtained using the segment metadata. In FIG. 8, the characters A, B and C are appearing in the moving image $M_1$; the characters A and C are appearing in the moving image $M_2$; only the character B is appearing in the moving image $M_3$; only the character A is appearing in the moving image $M_4$; the characters A and B are appearing in the moving image $M_5$; and the characters A and B are appearing in the moving image $M_6$. Accordingly, the characters A and B are commonly appearing in the moving images $M_1$, $M_5$ and $M_6$; the characters A and C are commonly appearing in the moving images $M_1$ and $M_2$; and the characters B and C are commonly appearing only in the moving image $M_1$.

As shown in FIG. 8, it can be seen using the segment metadata that the appearance time of the character A appearing in the moving image $M_1$ is forty (40), the appearance time of the character B appearing in the moving image $M_1$ is thirty (30), and the appearance time of the character C appearing in the moving image $M_1$ is ten (10); the appearance time of the character A appearing in the moving image $M_2$ is thirty (30), and the appearance time of the character C appearing in the moving image $M_2$ is forty (40); the appearance time of the character B appearing in the moving image $M_3$ is twenty (20); the appearance time of the character A appearing in the moving image $M_4$ is ten (10); the appearance time of the character A appearing in the moving image $M_5$ is five (5), and the appearance time of the character B appearing in the moving image $M_5$ is ten (10); and the appearance time of the character A appearing in the moving image $M_6$ is forty (40), and the appearance time of the character B appearing in the moving image $M_6$ is five (5).

A character with a long appearance time in a moving image may be considered as playing a major role in the moving image. Further, characters playing a major role may be considered as having a very close relation therebetween. On the contrary, characters with a short appearance time in a moving image may be considered as having a distant relation therebetween. For example, characters playing a minor role are considered as having a distant relation therebetween. In view of the foregoing, there is provided a method of calculating a relation value Rel based on the following equation 2, where appearance time PSL ($M_k$, A) indicates the appearance time of the character A appearing in the moving image $M_k$. In this case, PSL ($M_k$, A) is zero (0) if the character A does not appear in the moving image $M_k$. Further, Rel (A, B) indicates a relation value indicating the relation between the characters A and B. In addition, the square root of the right side of the equation 2 may be considered a relation value.

$$Rel(A, B) = \sum_k \{PSL(M_k, A) \cdot PSL(M_k, B)\} \quad (2)$$

In FIG. 8, a relation value indicating the relation between the characters A and B is 40×30 (moving image $M_1$)+30×0 (moving image $M_2$)+0×20 (moving image $M_3$)+10×0 (moving image $M_4$)+5×10 (moving image $M_5$)+40×5 (moving image $M_6$)=1450. Similarly, a relation value indicating the relation between the characters A and C is 1600 and a relation value indicating the relation between the characters B and C is 300. The relation matrix of FIG. 8 may be obtained from the relation values. Further, such calculation is the same with the same character. A character with a long appearance time may be considered a character with a high major level. Hence, a relation value of the same character (i.e., each diagonal element of the relation matrix) indicates a major level of each character.

The method of calculating a relation matrix based on the appearance time has been described above.

(1-2-5: Method of Calculating Relation Values Based on Appearance Scene Time)

Next, a method of calculating a relation value based on appearance scene time will be described with reference to FIG. 9. FIG is a view illustrating a method of calculating a relation value based on appearance scene time. Specifically, a method of calculating a relation value based on common appearance scene time in each moving image will be described. In this case, it is assumed that a group of moving images of interest includes moving images $M_1 \sim M_6$ where the characters A, B and C are appearing.

As shown in FIG. 9, the common appearance scene time of each pair of characters appearing in each moving image may be obtained using the segment metadata. In FIG. 9, the common appearance scene time of a pair of characters X and Y is denoted by [X, Y]. For example, the common appearance scene time of a pair of characters A and B appearing in the moving image $M_1$ is [A, B]=20. Similarly, for the moving image $M_1$, [A, A]=40, [B, B]=30, [C, C]=10, [A, C]=5, and [B, C]=5. In this case, [A, A] indicates the length of a common appearance segment of the character A and the character A. However, since the character A and the character A are the same character, the common appearance scene time of a pair of the character A and the character A is identical to the appearance time of the character A. This is the same with [B, B] or [C, C].

Characters appearing in the same image scene may be considered as having a close relation therebetween. For example, characters having a conversation therebetween appear in the same image scene. Further, opposing characters or friendly characters frequently appear in the same image scene in a moving image. A character playing as a hero and a character playing as a heroine also frequently appear in the same image scene. In view of the foregoing, there is provided a method of calculating a relation value Rel based on the following equation 3, where the common appearance scene time CSL ($M_k$, A, B) indicates the length of a common appearance segment of the characters A and B appearing in the moving image $M_k$. In this case, if any of them is not appearing in the moving image $M_k$, the common appearance scene time CSL ($M_k$, A, B) becomes zero (0). Further, Rel (A, B) indicates a relation value indicating the relation between the characters A and B. In addition, the square root of the right side of the equation 3 may be considered a relation value.

$$Rel(A, B) = \sum_k CSL(M_k, A, B) \quad (3)$$

In FIG. 9, a relation value indicating the relation between the characters A and B is 20 (moving image $M_1$)+0 (moving image $M_2$)+0 (moving image $M_3$)+0 (moving image $M_4$)+5 (moving image $M_5$)+5 (moving image $M_6$)=30. Likewise, the relation value indicating the relation between the characters A and C is 25 and the relation value indicating the relation between the characters B and C is 5. The relation matrix of FIG. 9 may be obtained from the relation values. This is the same with the same characters. The relation value of each of the same characters (i.e., diagonal elements of the relation matrix) indicates the total appearance time of each character.

The method of calculating the relation matrix based on the common appearance scene time has been described above.

As described above, from information obtained using the segment metadata, a relation between characters may be evaluated in a variety of viewpoints. The above-mentioned method of calculating the relation value is illustrative only.

For example, the relation value may be calculated using appearance time or common appearance scene time weighted with an area of a face portion. Further, the relation value may be calculated using appearance time or common appearance scene time weighted with a difference between a leading role and a supporting role.

(Other Method 1: Common Appearance Scene Time+Role Weight)

For example, a method of calculating a relation value Rel based on a combination of common appearance scene time CSL and role weight RW will be described. The definitions of CSL and RW have been described above. In this case, the relation value Rel (A, B) is expressed in the following equation 4. Here, the square root of the right side of the equation 4 may be omitted. In this method, a relation value may be calculated based on the role weight indicating the importance of a role of each character in each moving image and the common appearance scene time indicating the closeness of a relation between characters in each moving image.

$$Rel(A, B) = \sqrt{\sum_k \{RW(M_k, A) \cdot RW(M_k, B) \cdot CSL(M_k, A, B)\}} \quad (4)$$

(Other method 2: Common appearance scene time+appearance time)

For another example, a method of calculating a relation value Rel based on a combination of common appearance scene time CSL and appearance time PSL will be described. The definitions of CSL and PSL have been described above. In this case, the relation value Rel (A, B) is expressed in the following equation 5. Here, the square root of the right side of the equation 5 may be omitted. In this method, a relation value may be calculated based on the appearance time indicating the importance of a role of each character in each moving image and the common appearance scene time indicating the closeness of relation between characters in each moving image.

$$Rel(A, B) = \sqrt{\sum_k \{PSL(M_k, A) \cdot PSL(M_k, B) \cdot CSL(M_k, A, B)\}} \quad (5)$$

[1-3: Method of Displaying Objects]

Next, a method of displaying an object using the above-mentioned relation value will be described with reference to FIGS. 10~24. For example, as shown in FIG. 10, each character appearing in a moving image is represented as an object. In this case, objects with a high relation value are displayed to be adjacent to each other. By using this display method, a relation between characters may be easily recognized. The object is mainly displayed by the object display unit 104. The method of displaying objects will be described in detail.

(1-3-1: Size of Object)

Figure 11:
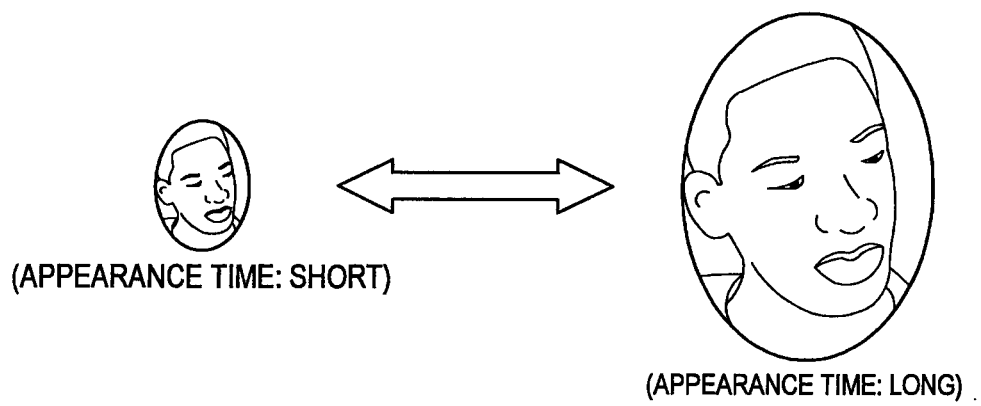
FIG. 11 is a view illustrating a method of displaying an object according to an exemplary embodiment of the present disclosure.

Referring to FIG. 11, the information on appearance time of each character may be used to represent objects. The information on appearance time of each character obtained using the segment metadata includes the information on appearance time in each moving image and the information on the total appearance time. Here, a method of representing objects using the total appearance time will be described. The total appearance time may be considered an indicator indicating a major level or attention level of a character. For example, a character playing a leading role in many moving images may have a long total appearance time. Hence, it is preferable that an object corresponding to a character with a long total appearance time is conspicuously represented.

In view of the foregoing, as shown in FIG. 11, an object representing a character with a long total appearance time is represented to have a large size by the object display unit 104 and an object representing a character with a short total appearance time is represented to have a small size by the object display unit 104. By such representation, it is possible to easily recognize a character with a high major level among characters appearing in a group of moving images of interest. Further, the display size of an object may be changed stepwise or continuously according to total appearance time.

For example, the object display unit 104 uses a first threshold $Th_1$ and a second threshold $Th_2$ ($Th_2 < Th_1$) to set the display size to large when the total appearance time T is $T > Th_1$, to set the display size to middle when the total appearance time T is $Th_2 < T \leq Th_1$, and to set the display size to small when the total appearance time T is $T \leq Th_2$. Further, the object display unit 104 may use a linear function or a monotonically increasing function $f$ to calculate a display size $S = \alpha * f(T)$ depending on the total appearance time T. Although the total appearance time has been used to represent the object, an average, a median, or a maximum of appearance time in each moving image may be used. Further, an object of a character with a total appearance time not greater than a predetermined threshold may not be displayed. With such display, an object of a character playing a supporting role or an extra may not be displayed; thus, an object of a character playing a major role may be easily recognized.

(1-3-2: Distance Between Objects)

Figure 12:
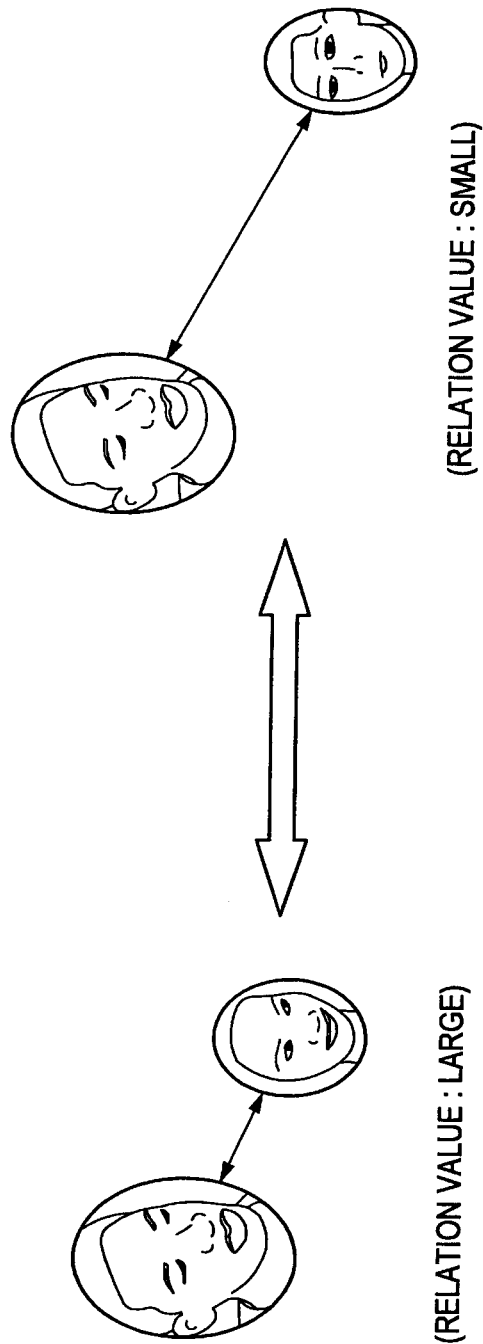
FIG. 12 is a view illustrating a method of displaying an object according to an exemplary embodiment of the present disclosure.

Next, a method of displaying a relation between characters as a distance between objects will be described with reference to FIG. 12. The relation between characters is represented by a relation value. As shown in FIG. 12, the greater relation value between characters, the smaller distance between objects. On the contrary, the smaller relation value between characters, the greater distance between objects. However, in the case that a plurality of objects are displayed as shown in FIG. 10, it is not preferable that visibility is damaged. Hence, the objects are preferably arranged to be dispersed. Further, the objects are preferably arranged within the display area.

An energy function E expressed in the following equation 6 will be described. The energy function E(A) represents energy generated when an object of the character A is positioned at coordinates (x, y) within the display area (hereinafter referred to as "potential energy"). The object display unit 104 determines a position of an object corresponding to each character so that the sum TE of energy function E for every character may be minimized. As expressed in the following equation 6, the energy function E consists of the following two terms: the first term $E_1$ denoting potential energy for a relation between characters; and the second term $E_2$ denoting potential energy for a position within the display area. These terms will be described in detail.

$$E(A) = E_1(A) + E_2(A) \quad (6)$$

Figure 14:
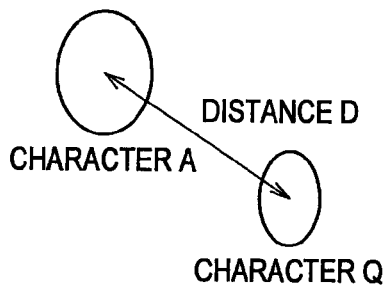
FIG. 14 is a view illustrating a method of displaying an object according to an exemplary embodiment of the present disclosure.

The first term $E_1$ will be first described. For example, as expressed in the following equation 7, the first term $E_1(A)$ for the character A is expressed by the sum of energy function $E_{11}(A, Q)$ for a relation between characters A and Q (Q=B, C, ...). Further, as expressed in the following equation 8, the energy function $E_{11}(A, Q)$ is defined as a function of a relation value R(A, Q) and a distance D(A, Q). In this case, R(A, Q) indicates a relation value for a pair of the characters A and Q (i.e., the above-mentioned Rel (A, Q)), and D(A, Q) indicates a distance between an object of the character A and an object of the character Q within the display area as shown in FIG. 14. Here, $k_{11}$, $k_{12}$ and $k_{13}$ denote normalized coefficients.

$$E_1(A) = \sum_Q E_{11}(A, Q) \qquad (7)$$

$$E_{11}(A, Q) = \begin{cases} k_{11}\left(D(A, Q) - \dfrac{k_{12}}{R(A, Q)}\right)^2 : & \text{There is a relation between characters } A \text{ and } Q \\ \dfrac{k_{12}}{D(A, Q)} : & \text{No relation between characters } A \text{ and } Q \end{cases} \qquad (8)$$

Figure 13:
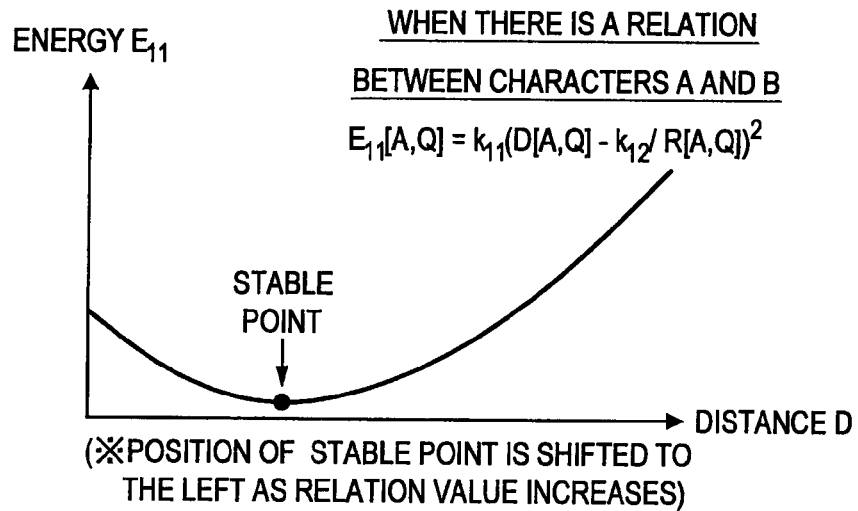
FIG. 13 is a view illustrating a method of displaying an object according to an exemplary embodiment of the present disclosure.

If there is a relation between the characters A and Q, the energy function $E_{11}(A, Q)$ represents a convex-down curve with a minimum value (or a stable point) at $D(A, Q) = k_{12}/R(A, Q)$, as shown in FIG. 13. As described above, the objects may be arranged so that the energy may be minimized. Hence, a distance between the object of the character A and the object of the character Q may be determined as a value near the stable point. The position of the stable point is shifted to the left as the relation value R(A, Q) increases. That is, the closer relation between the character A and the character Q, the closer distance between the object of the character A and the object of the character Q. Although the energy function $E_{11}$ (A, Q) has been represented in a quadratic function, any function other than a quadratic function to represent the curve shown in FIG. 13 may be used.

Figure 15:
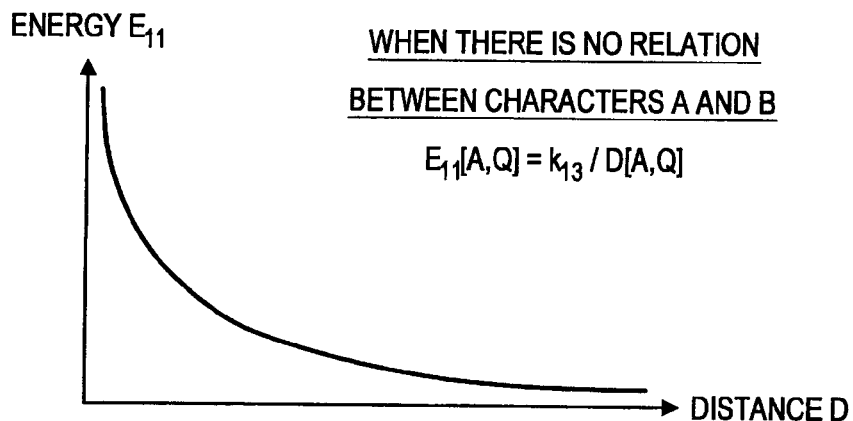
FIG. 15 is a view illustrating a method of displaying an object according to an exemplary embodiment of the present disclosure.

On the other hand, if there is no relation between the character A and the character Q, the energy function $E_{11}(A, Q)$ is a monotonically decreasing function with the increased D(A, Q), as shown in FIG. 15. In this case, if the object of the character A and the object of the character Q are closer to each other, the energy increases. In other words, if there is no relation between the character A and the character Q, the object of the character A and the object of the character Q are increasingly distant from each other. However, as the objects are increasingly distant from each other, one of or both of the objects may get out of the display area. In view of the foregoing, the second term E2 indicating potential energy for a position of each object may be introduced.

Figure 16:
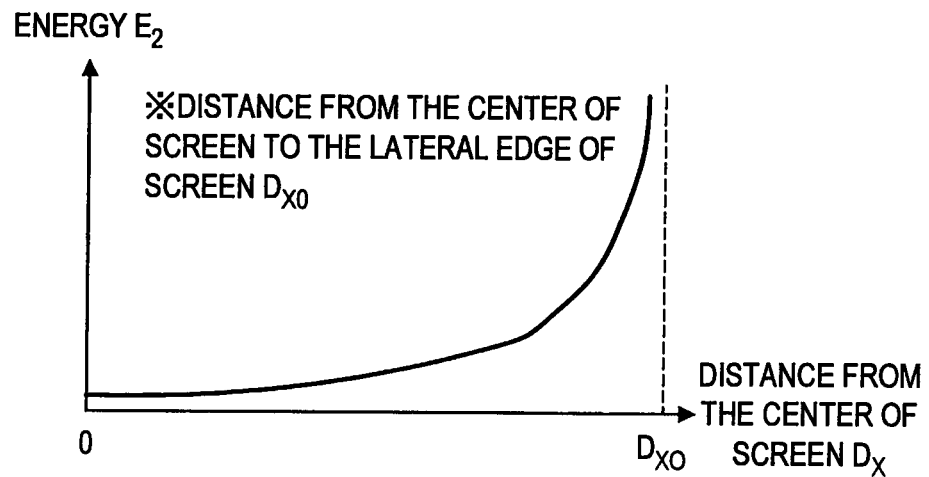
FIG. 16 is a view illustrating a method of displaying an object according to an exemplary embodiment of the present disclosure.
Figure 17:
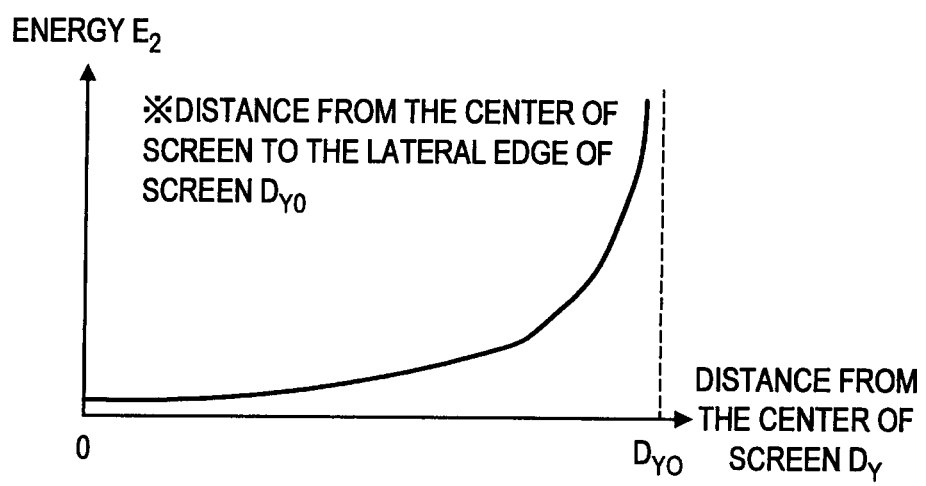
FIG. 17 is a view illustrating a method of displaying an object according to an exemplary embodiment of the present disclosure.
Figure 18:
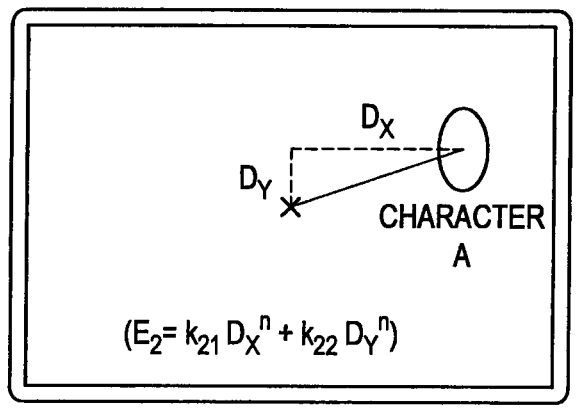
FIG. 18 is a view illustrating a method of displaying an object according to an exemplary embodiment of the present disclosure.

The second term $E_2$ is defined as a function of a distance $D_X$ measured from the center of a screen along the X-direction (see FIG. 18) and a distance $D_Y$ measured from the center of the screen along the Y-direction (see FIG. 18), which will be expressed in the following equation 9, where $k_{21}$ and $k_{22}$ are normalized coefficients and $n \geq 2$. The second term $E_2$ is not limited to the function expressed by the following equation 9 if the second term $E_2$ is a function having a minimum value when $D_X = 0$ and $D_Y = 0$, and representing a curve increasing in value with the increased distances $D_X$ and $D_Y$. For example, as shown in FIGS. 16 and 17, the second term $E_2$ may be a function with an asymptotic curve tangent to an asymptotic direction of a lateral edge of the display area. Further, the second term $E_2$ may be a step function that increases stepwise depending on the distance from the center of the screen.

$$E_2(A) = k_{21} * D_X^n + k_{22} * D_Y^n \qquad (9)$$

If the second term $E_2$ is defined as described above, the energy of an object increases as the object is increasingly closer to the lateral edge of the screen. Hence, although the object gets closer to the lateral edge of the screen by the effect of the first term $E_1$, the object may be prevented from being too close to the lateral edge of the screen by the effect of the second term $E_2$. As a result, the object may be prevented from getting out of the display area. On the other hand, the object may exceed the display area depending on the definition of the second term $E_2$. If the second term $E_2$ is expressed by the equation 9, the maximum allowable amount of exceeding the display area may be determined according to the index n. The maximum allowable amount may be set to be large enough for the object to considerably exceed the display area.

As described above, the object display unit 104 determines the arrangement of each object corresponding to each character so that the sum TE of the energy function E for every character U (U=A, B, C, . . . ) may be minimized (see the following equation 10). Examples of the method of determining the position of each object for the sum TE to be minimized may include optimization techniques, such as steepest descent, simulated annealing, or genetic algorithms. The object display unit 104 determines the coordinates of each object in the display area using the above-mentioned techniques and displays a group of objects as shown in FIG. 10.

As shown in FIG. 10, objects of characters with a close relation are displayed to be adjacent to each other, while objects of characters with no relation are displayed to be distant from each other. As a result, the objects of the related characters are in a cluster. For example, as shown in FIG. 10, a group of objects of characters commonly appearing in the same moving image is in a cluster. Further, groups of objects of characters appearing in different moving images may also be represented to have a relation therebetween through a character. In FIG. 10, most of characters appearing in the moving image $M_3$ are not commonly appearing with characters appearing in the moving image $M_4$. However, since there is a character commonly appearing in the moving images $M_3$ and $M_4$, a group of objects of the characters appearing in the moving image $M_3$ and a group of objects of the characters appearing in the moving image $M_4$ are displayed to be close to each other through an object of the character commonly appearing in the moving images $M_3$ and $M_4$. Accordingly, by using the method of displaying objects according to the present embodiment, it is possible to visually represent a direct relation between characters as well as an indirect relation between characters.

$$TE = \sum_U E(U) \qquad (10)$$

(1-3-3: Representation of Depth)

Figure 19:
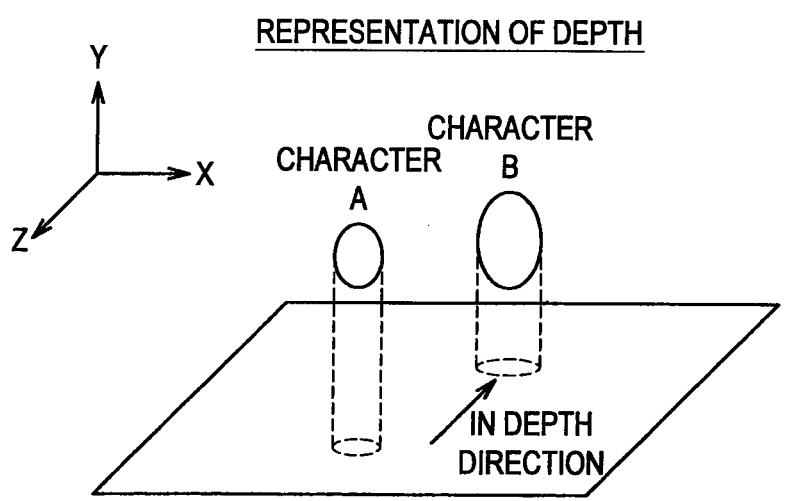
FIG. 19 is a view illustrating a method of displaying an object according to an exemplary embodiment of the present disclosure.

In FIG. 10, the object group may be seen to be arranged in a two-dimensional plane. Using the above-mentioned method, the object group may be properly arranged in a two-dimensional plane. However, the above-mentioned method may be extended to a method of arranging the object group in a three-dimensional (3D) space. For example, as shown in FIG. 19, a two-dimensional arrangement may be extended to a three-dimensional arrangement by moving an object in depth direction. Examples of the method of moving an object in depth direction may include a method of moving an object in a random manner or a method of moving an object depending on the size of the object. Specifically, as shown in FIG. 19, it is preferable that an object with a large size is moved a little in depth direction and an object with a small size is moved a little forward.

Further, assuming that an object is represented in three-dimensional coordinates, the energy function E may be defined using a distance D in a three-dimensional space and a relation value R. In this case, by an arrangement representation of a group of objects based on the relation value, the relation between characters may be represented in a 3D space. In particular, the 3D representation is effective for a user interface that enables an object to be freely moved or enlarged/reduced in a 3D space or allows a change of a viewpoint.

The first term $E_1$ is a function defined by the distance D and the relation value R. Hence, even though the two-dimensional arrangement is extended to the 3D arrangement, the function type of the first term $E_1$ does not have to be changed. Further, if it does not matter however distant the object is in depth direction (assuming infinite space), the function type of the second term $E_2$ does not have to be changed. However, if the object becomes too distant in depth direction, the object may not be recognized. In this case, it is preferable that the function type of the second term $E_2$ is changed so that the energy may be increased as the object is increasingly distant in depth direction. Further, the 3D space may be limited to, for example, a cubic space or a quadrangular pyramid space (within one's range of vision).

Accordingly, a group of objects may be arranged in a 3D space by adding the depth representation.

(1-3-4: Representation of Relation)

Next, another method of representing a relation will be described.

(Display of Connection Line)

As described above, when the above-mentioned methods are applied, objects of characters with a close relation are positioned to be closed to each other, while objects of characters with a distant relation are positioned to be far from each other. Accordingly, a relation between characters may be estimated from a distance between the objects or a positional relation of a group of objects. However, it may be desired to clearly recognize whether or not there is a relation between the objects. For example, if too many objects are densely positioned within a display area, it may not be certainly determined only from the distance between the objects whether or not there is a relation therebetween.

Figure 20:
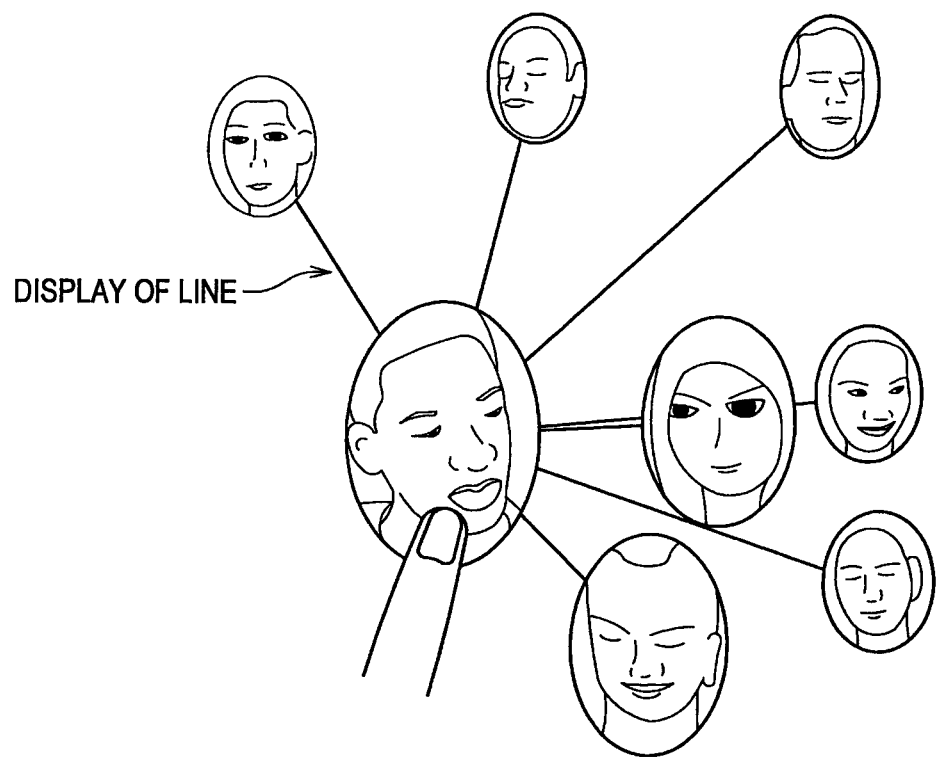
FIG. 20 is a view illustrating a method of displaying an object according to an exemplary embodiment of the present disclosure.

In view of the foregoing problem, as shown in FIG. 20, a method of displaying a connection line indicating whether or not there is a relation between objects is presented. For example, if an object is selected by a user, the selected object is connected with a connection line to another object of another character related to a character corresponding to the selected object. That is, it can be definitely recognized from the connection line whether or not there is a relation between the objects. Although the connection line is made when the object is selected by the user in FIG. 20, the connection line may be made at all times. However, in the case that there are a lot of objects within the display area as shown in FIG. 10, connection lines displayed at all times may cause a complicated display. Accordingly, the connection lines are preferably displayed when the objects are selected by the user.

(Motion of Object)

Figure 21:
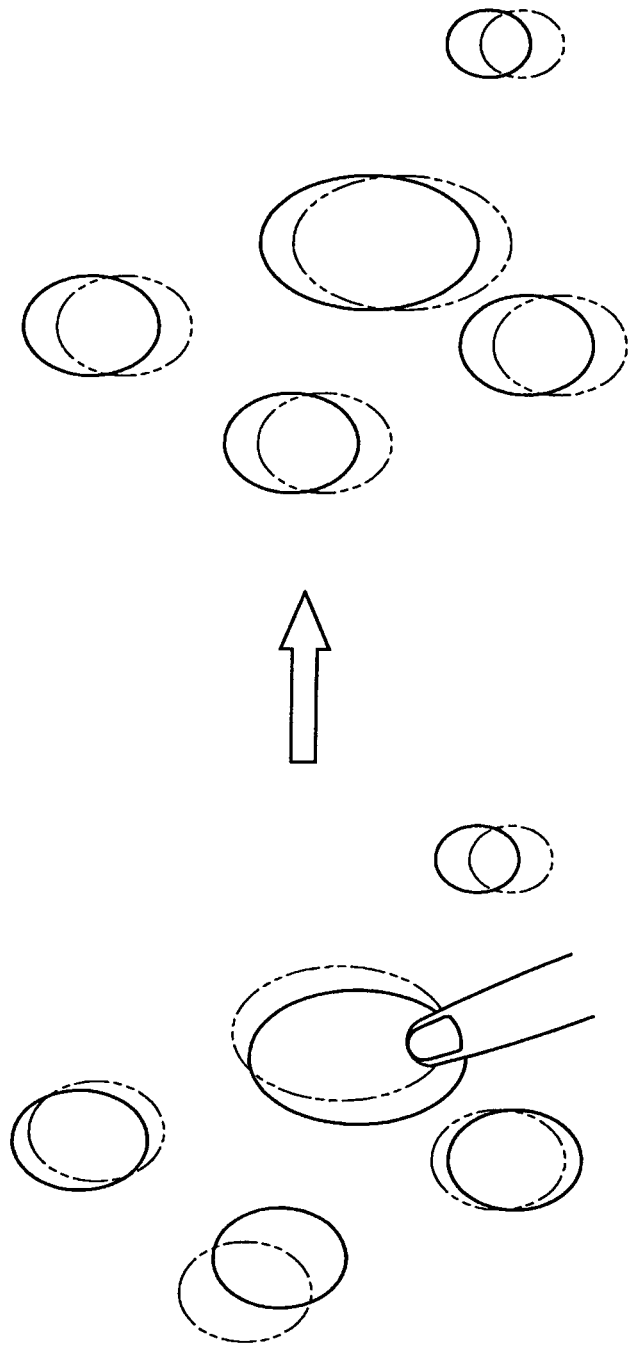
FIG. 21 is a view illustrating a method of displaying an object according to an exemplary embodiment of the present disclosure.

So far, the display position of each object has been considered as being fixed. It should be understood that the display position of each object may be fixed. However, vibrating objects may create a motion within a screen; thus, a more user-friendly interface may be implemented. Further, a relation between characters may be represented by the vibration of objects. For example, as shown in FIG. 21, objects are usually set to vibrate at random; however, if one of the objects is selected, objects of characters related to a character corresponding to the selected object may be set to vibrate in phase. In this case, it may be instantly recognized whether or not there is a relation between objects despite no connection lines.

Figure 23:
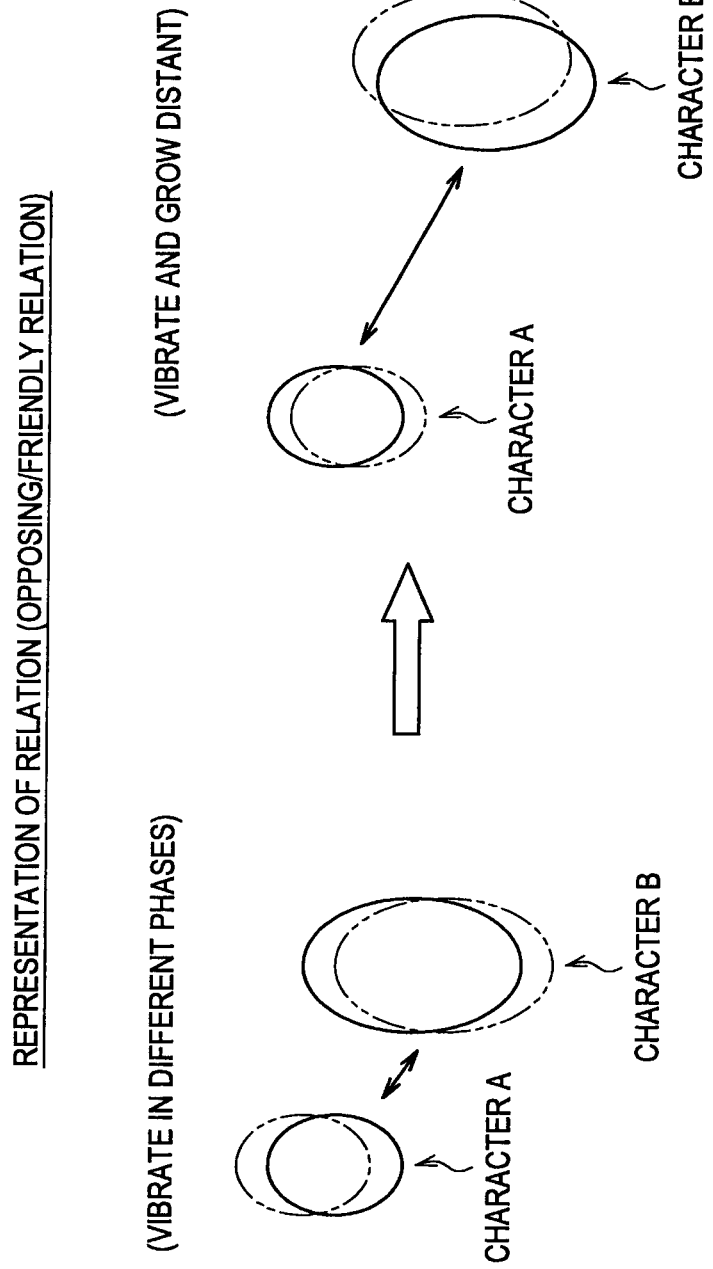
FIG. 23 is a view illustrating a method of displaying an object according to an exemplary embodiment of the present disclosure.

If such information as role is obtained based on object metadata, the motion of an object may be controlled based on the information. For example, in the case that a character A is a hero and a character B is a heroine, the object display unit 104, as shown in FIG. 22, makes an object of the character A and an object of the character B vibrate in phase and makes both of the objects approach each other. On the other hand, in the case that the character A and the character B are opposing to each other, the object display unit 104, as shown in FIG. 23, makes the object of the character A and the object of the character B vibrate in opposite phases and makes both of the objects distant from each other. Accordingly, the relation may be easily recognized with such representation.

Figure 24:
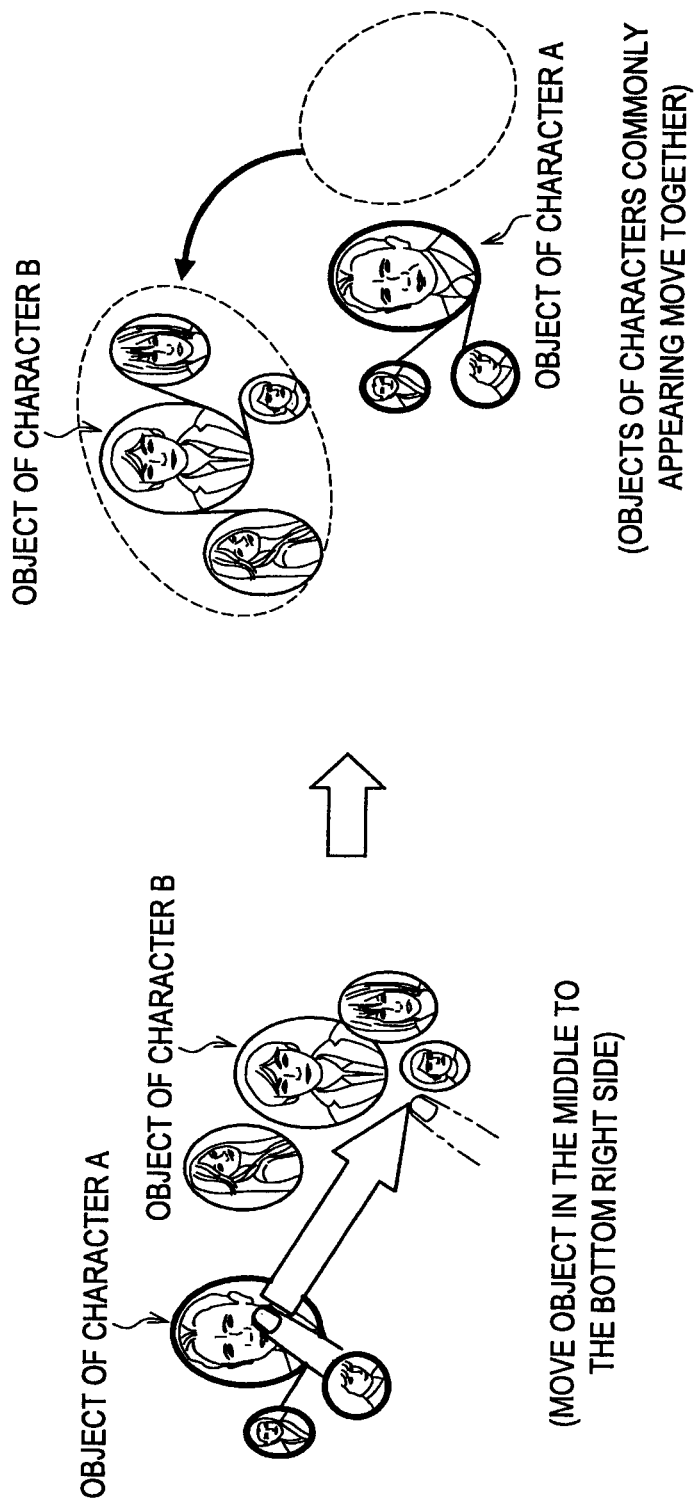
FIG. 24 is a view illustrating a method of displaying an object according to an exemplary embodiment of the present disclosure.

Further, the position of an object may be changed with a drag operation. For example, as shown in FIG. 24, an object of a character A may be selected and moved to a desired position. If only the object of the character A is moved away, the relation between characters may not be recognized from the distance between the objects. Hence, in the case that the object of the character A is moved, the object display unit 104 also moves objects of characters related to the character A. In this case, the object display unit 104 adjusts the position of each object after each object is moved so that the distance between the objects may be based on the relation value.

Further, the movement of the object of the character A may affect an object of a character B who has no relation with the character A. As described above, the arrangement of each object may be determined so that the sum of energy TE for every object may be minimized. Hence, if the object of the character A and related objects are moved, the sum of energy TE for every object may be changed accordingly. In this case, the object display unit 104 moves, for example, an object of a character B and related objects so that the sum of energy TE for every object may be minimized.

However, if the recalculation of TE is too burdensome a task, the object display unit 104, as shown in FIG. 24, may move the object of the character B and the related objects to avoid the object of the character A and the related objects. The farther the objects of unrelated characters are distant from each other, the lower sum of energy TE. On the other hand, the position of each object may be adjusted so that unrelated groups of objects may become distant more than a predetermined distance from each other without the recalculation of the sum of energy TE.

The method of displaying objects based on relation values has been described above.

[1-4: Method Of Displaying Scene Images]

Next, a method of displaying a scene image will be described with reference to FIGS. 25~28.

A scene image is an image of one scene of a moving image or an image representing the moving image. For example, a first moving image frame may be extracted from a moving image and be used as a scene image. Further, a package picture of a moving image may be used as a scene image. Further, a moving image frame where a character with the longest appearance time appears may be extracted and used as a scene image. In addition, a moving image frame randomly extracted from a moving image may be used as a scene image, a moving image frame where a character playing a leading role appears may be used as a scene image, or a moving image may be replayed as a scene image. As such, a variety of images may be used as scene images.

Figure 25:
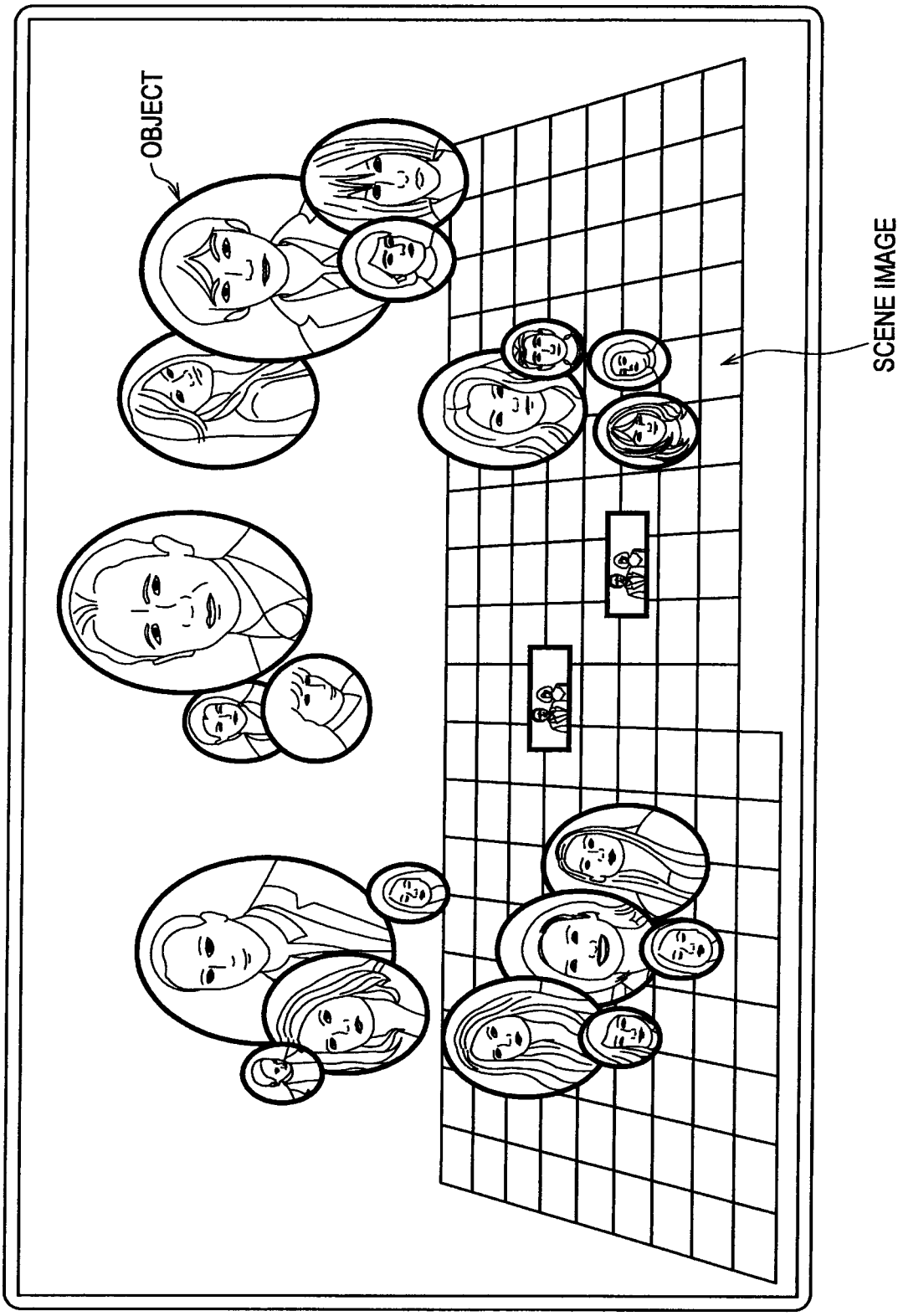
FIG. 25 is a view illustrating a method of displaying an object and a method of displaying a scene image according to an exemplary embodiment of the present disclosure.

As shown in FIG. 25, scene images corresponding to a moving image of interest are displayed together with objects. The scene images are arranged side by side in a tiled manner. For example, if an object is selected, a scene image of a moving image where a character corresponding to the object appears is highlighted. If the character corresponding to the selected object appears in a plurality of moving images or in a plurality of image scenes, a plurality of scene images may be highlighted as shown in FIG. 25. Accordingly, with such highlight representation, it is possible to easily recognize how many moving images the character corresponding to the selected object appears in.

Further, if the scene images are arranged according to a predetermined rule, it is possible to easily recognize from the distribution of highlighted scene images, for example, what type or period of a moving image a character corresponding to the selected object appears in. A method of arranging scene images will be described.

(1-4-1: Method of Arranging Scene Images (Random Arrangement))

Figure 26:
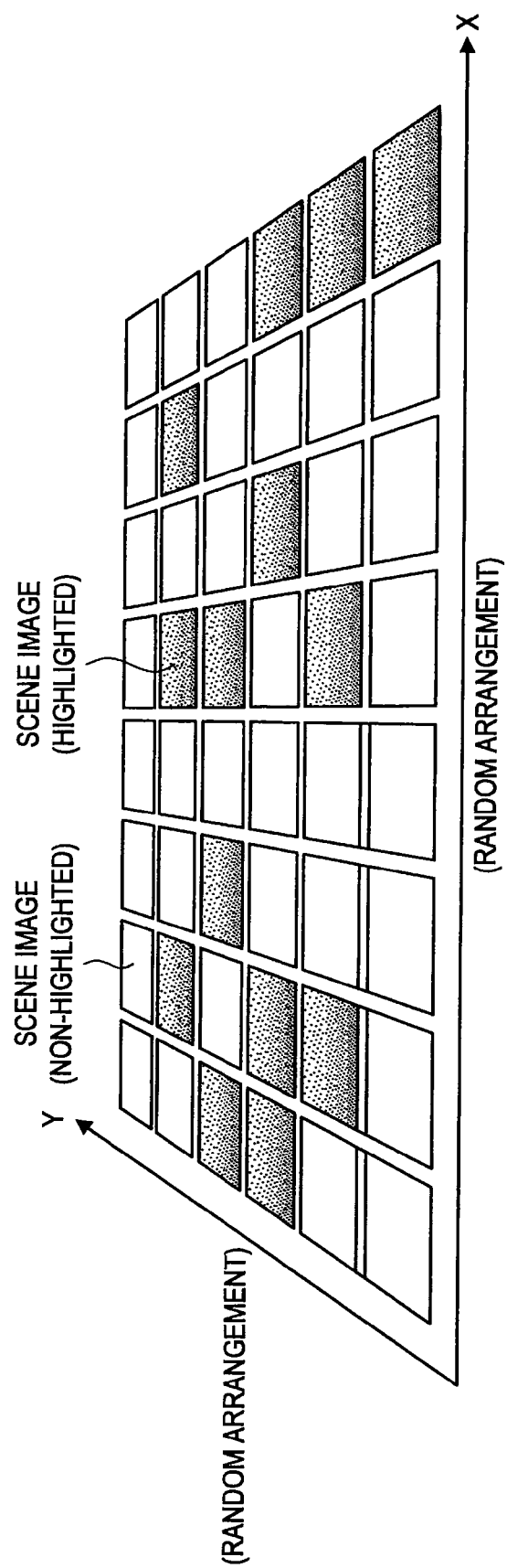
FIG. 26 is a view illustrating a method of displaying a scene image according to an exemplary embodiment of the present disclosure.

As shown in FIG. 26, scene images may be arranged at random. In this case, if an object is selected, a scene image of a moving image where a character corresponding to the object appears is highlighted. Further, if the scene images are set to be rearranged at a predetermined timing, the position of a highlighted scene image is frequently changed, thereby implementing a less monotonous user interface.

Further, since the scene images are highlighted at random positions, a bustling user interface may be implemented. Despite the random arrangement, the proportion of the highlighted scene images may be easily recognized. Hence, it is possible to instantly recognize the appearance frequency of the character corresponding to the selected object.

(1-4-2: Method of Arranging Scene Images (Time-Series Arrangement))

Figure 27:
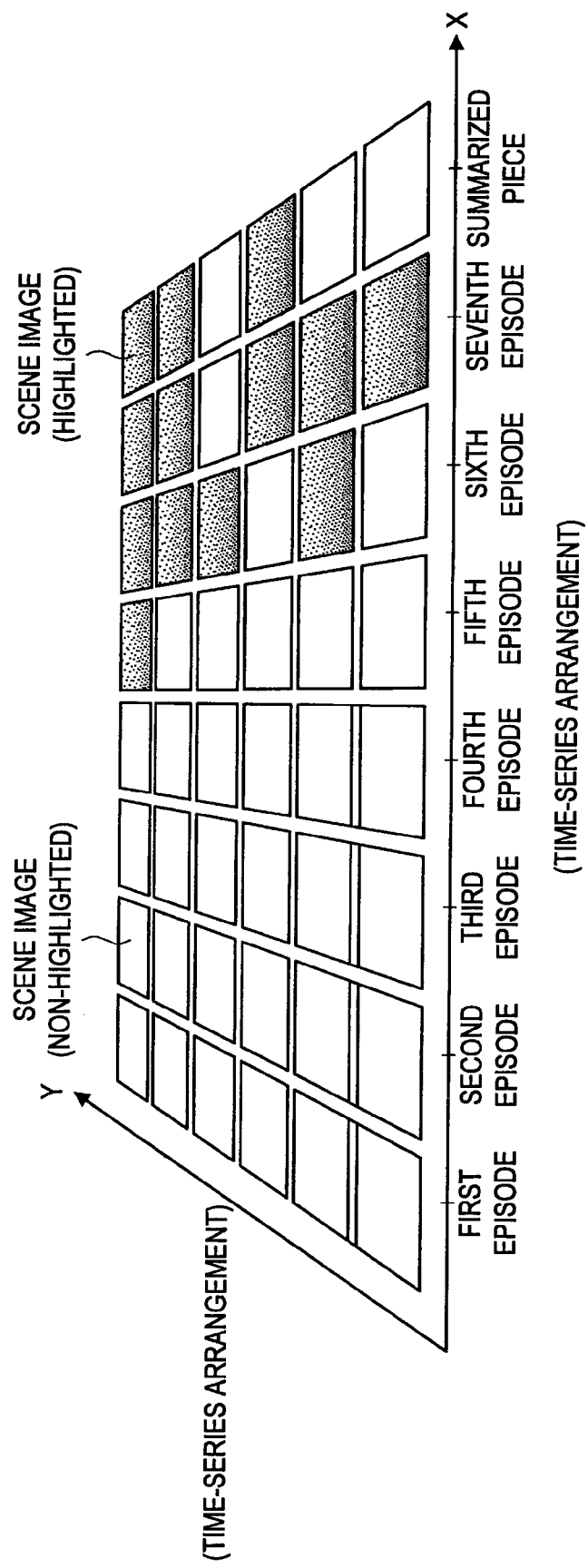
FIG. 27 is a view illustrating a method of displaying a scene image according to an exemplary embodiment of the present disclosure.

As shown in FIG. 27, scene images may be arranged in time series. In FIG. 27, a series of moving images are arranged in time series along the X-axis, while a series of scene images appearing in each of the moving images are arranged in time series along the Y-axis. In such arrangement, it can be easily recognized from the distribution of highlighted scene images, for example, whether a character corresponding to a selected object appears in an early stage of the series of moving images or in a later stage of the series of moving images. Further, it can be easily recognized from the distribution of highlighted scene images whether the character is frequently appearing in an early stage, in a middle stage, or in a later stage of the series of moving images.

In FIG. 27, a scene image in a later stage of a fifth episode and scene images in the entire stage of sixth and seventh episodes are highlighted. Hence, it can be easily recognized that a character corresponding to the selected object is appearing in the later stage of the fifth episode to the end of the seventh episode. Further, in case of a summarized piece, since scene images in a later stage of the summarized piece are highlighted, it is possible to easily recognize that the character corresponding to the selected object appears in a later stage of this series of moving images. Accordingly, by arranging the scene images in time series, it is possible to easily recognize the appearance period of the character or the tendency of the scenes where the character appears. Although a series of moving images has been illustrated above, scene images of a group of moving images with a time factor may be similarly arranged in time series.

(1-4-3: Method of Arranging Scene Images (Mood-Based Arrangement))

Figure 28:
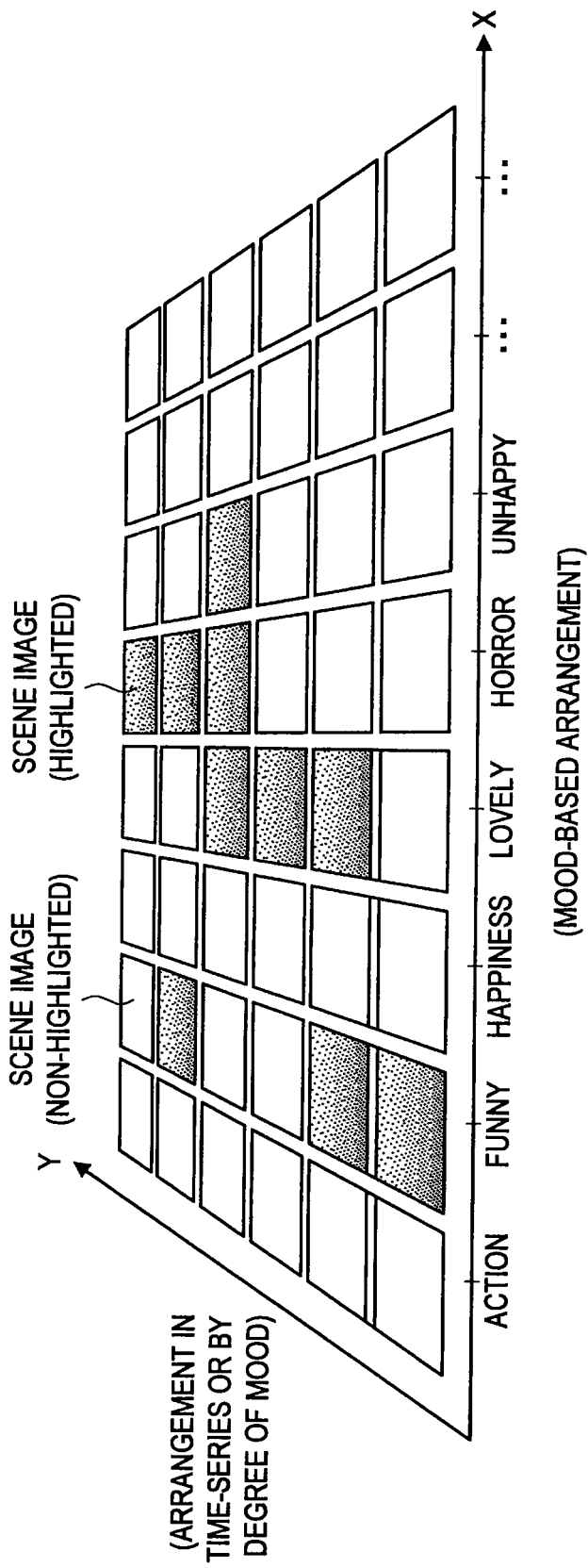
FIG. 28 is a view illustrating a method of displaying a scene image according to an exemplary embodiment of the present disclosure.

As shown in FIG. 28, a method of arranging scene images by mood will be described. For example, as shown in FIG. 28, scene images may be arranged in columns by action, funny, happy, lovely, horror, or unhappy mood. Further, the scene images may be arranged in rows in time series or by the degree of mood. For example, in the case of the action column, scene images of a moving image with relatively many action scenes may be displayed in the front of the action column, while scene images of the moving image with relatively small action scenes may be displayed in the back of the action column.

With such arrangement, by using the distribution of highlighted scene images, it is possible to easily recognize, for example, the mood type of a moving image where a character corresponding to a selected object appears. Further, it is possible to select a moving image with a lot of action scenes from among moving images where a character A appears. Further, by the operation of selecting highlighted scene images, a moving image corresponding to the selected scene images may be replayed. With such mechanism, a user may instantly replay a desired moving image. In addition, a predetermined mood type of image scenes may be selectively replayed from among the moving image.

The method of arranging scene images has been described above.

[1-5: Change of Scene Image Display and Object Display]

Next, a method of displaying a group of scene images and a method of changing object display will be described with reference to FIGS. 29 to 32. As shown in FIG. 25, a group of scene images arranged in a tiled manner is displayed together with objects. The scene images may be highlighted upon selection of objects. Further, by selecting a scene image, a moving image corresponding to the scene image may be replayed. Such configuration has been already described above. Next, an idea for operation of changing a group of scene images will be described. Further, the operation of changing a group of scene images may be followed by operation of changing object display, which will also be described.

(1-5-1: Change of Period)

Figure 29:
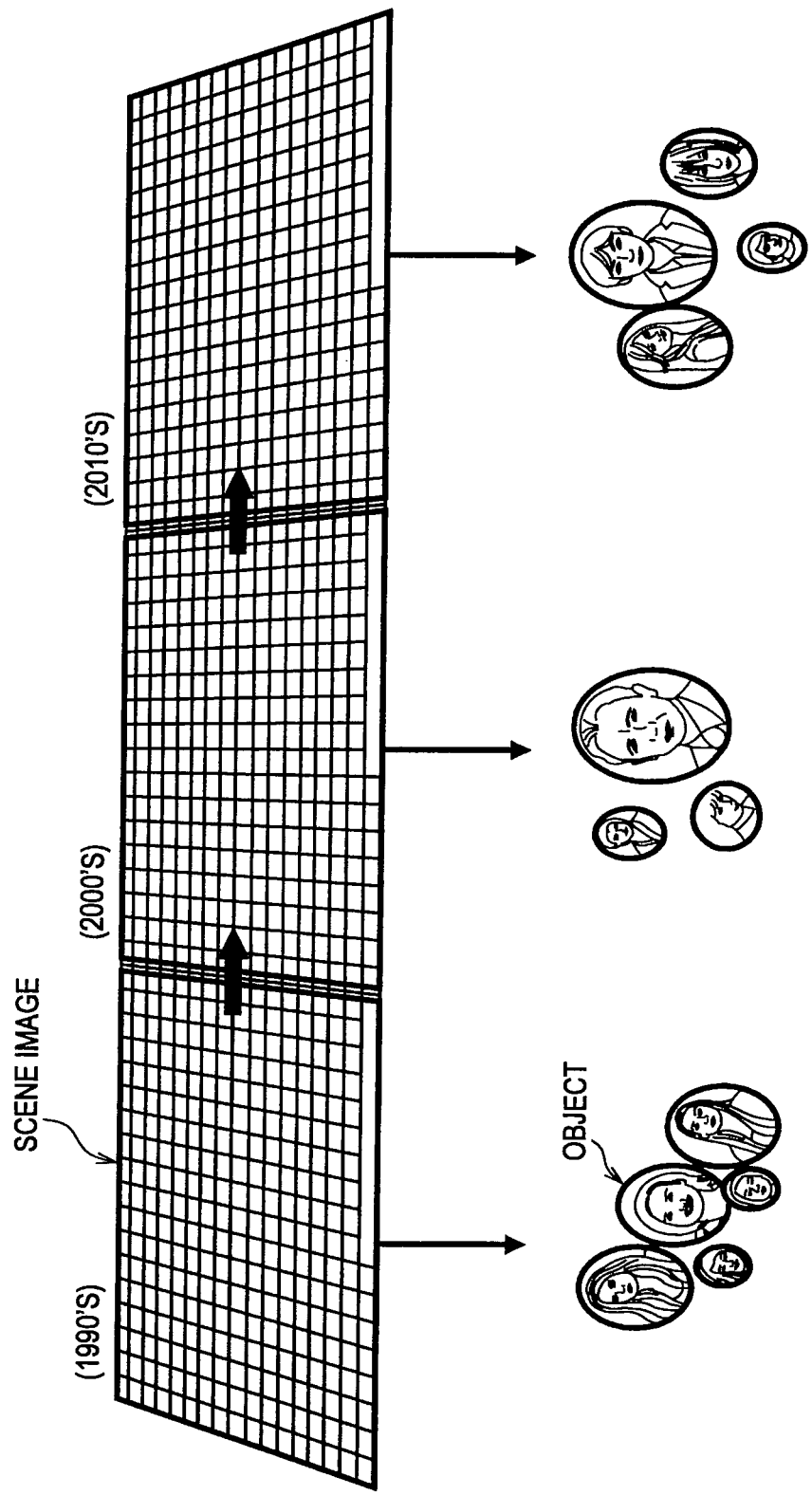
FIG. 29 is a view illustrating a method of displaying an object and a method of displaying a scene image according to an exemplary embodiment of the present disclosure.

For example, as shown in FIG. 29, each group of scene images may be categorized according to period. In this case, the period of a moving image of interest may be changed by changing a group of scene images. A group of scene images displayed with a group of objects belongs to one period. The group of objects displayed with the group of scene images corresponds to characters appearing in a moving image corresponding to the group of scene images. Hence, if the group of scene images is changed, the group of objects displayed with the group of scene images is changed accordingly.

For example, when a group of scene images for a moving image in the 1990's is displayed, a group of objects displayed with the group of scene images represents actors or actresses playing active roles in the 1990's. If the group of scene images is changed to a group of scene images for a moving image in the 2000's, a group of objects displayed with the group of scene images represents actors or actresses playing active roles in the 2000's. As such, using a user interface configured to change each group of scene images categorized according to period, it is possible to easily recognize actors or actress playing active roles during each period.

The group of scene images may be further divided into subcategories. For example, the group of scene images may be divided into television dramas in the 1990's, television dramas in the 2000's, television dramas in the 2010's, movies in the 1990's, movies in the 2000's, and movies in the 2010's. In this case, for example, by changing a group of scene images, it is possible to recognize the changes of actors or actresses playing active roles in television dramas. Further, by changing a group of scene images, it is possible to easily distinguish actors or actresses playing active roles in televisions from actors or actresses playing active roles in movies during the same period.

As such, by categorizing a group of scene images according to a period of time, it is possible to easily recognize the changes in appearance tendency of characters from the change of a group of objects which results from the change of a group of scene images.

(1-5-2: Change of Region)

Figure 30:
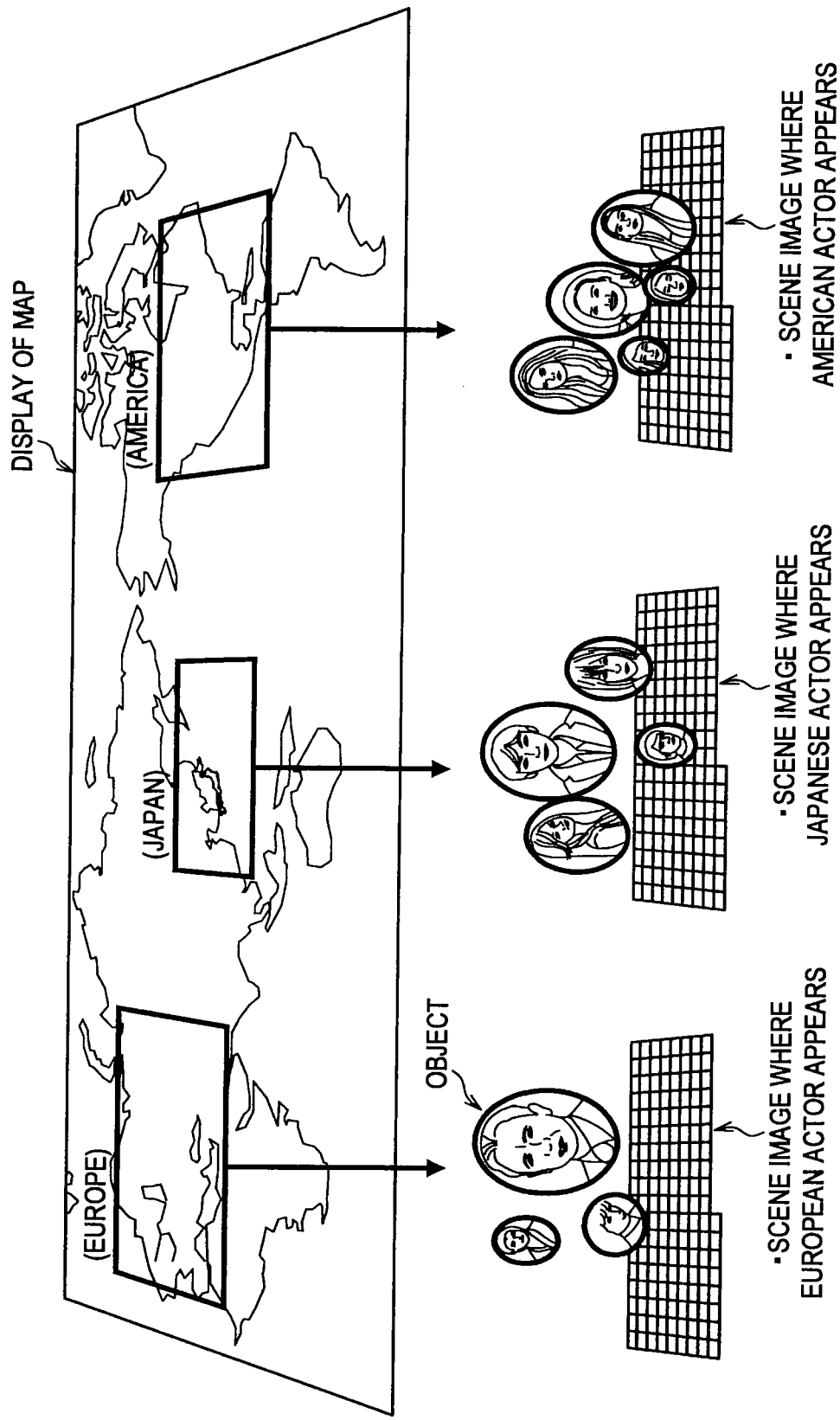
FIG. 30 is a view illustrating a method of displaying an object and a method of displaying a scene image according to an exemplary embodiment of the present disclosure.

FIG. 29 is a view illustrating a method of changing object display to correspond to the change of a group of scene images which is categorized according to a period of time. Next, a method of changing a group of scene images and a group of objects according to region will be described with reference to FIG. 30. As shown in FIG. 30, a user interface configured for a user to select a region on a map which is displayed on a screen is presented. If the user selects Europe using the user interface, the object display unit 104 displays a group of scene images of a moving image where European actors/actresses appear and a group of objects corresponding to the actors/actresses. If the user selects America using the user interface, the object display unit 104 displays a group of scene images of a moving image where American actors/actresses appear and a group of objects corresponding to the actors/actresses.

The object display unit 104 may display a group of scene images on the map. For example, the object display unit 104 may display a group of scene images of a moving image, in which European actors/actresses appear, on a region corresponding to Europe on the map. Similarly, the object display unit 104 may display a group of scene images of a moving image, in which Japanese actors/actresses appear, on a region corresponding to Japan on the map, or may display a group of scene images of a moving image, in which American actors/actresses appear, on a region corresponding to America on the map. Further, the change of period may be performed for each region. For example, a group of scene images in the 1990's where European actors/actresses appear may be changed to a group of scene images in the 2000's where European actors/actresses appear.

As such, by categorizing a group of scene images according to geographic region, it is possible to easily recognize actors/actresses playing active roles in each region. Further, it is possible to easily recognize actors/actresses playing active roles worldwide.

(1-5-3: Display of Objects Upon Change)

Figure 31:
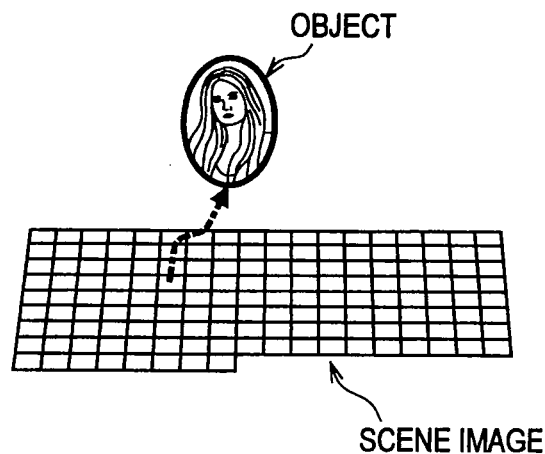
FIG. 31 is a view illustrating a method of displaying an object and a method of displaying a scene image according to an exemplary embodiment of the present disclosure.

As shown in FIG. 31, when a group of scene images is changed, an object may be displayed to get out of the group of scene images. For example, an object of a character A may be displayed to get out of a scene image indicating an image scene of a moving image where the character A appears. If the character A appears in a plurality of moving images, the character A may be displayed to get out of a scene image corresponding to a moving image where the character A appears for the longest appearance time. With such display, it is possible to easily recognize a correspondence relation between a scene image and a character.

The method of displaying a group of scene images and the method of changing object display have been described above.

[1-6: Other Display Methods]

So far, the methods of displaying a group of scene images and objects have been described taking into account the display configuration of FIG. 10. Next, a modified example of a method of displaying a group of scene images, a method of displaying related information, and a method of displaying a moving image replay screen will be described.

(1-6-1: 3D Display)

Figure 32:
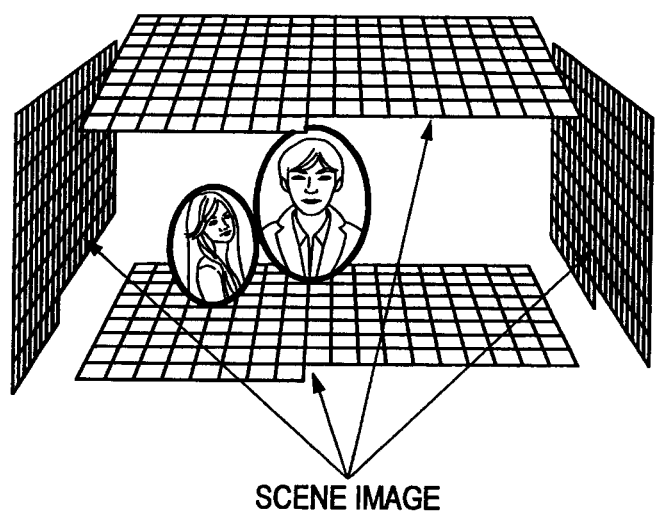
FIG. 32 is a view illustrating a method of displaying an object and a method of displaying a scene image according to an exemplary embodiment of the present disclosure.

In FIG. 10, a group of scene images is displayed below objects. As shown in FIG. 32, however, a group of scene images may be displayed above, below, left and right of objects. With such display, more scene images may be displayed. If more scene images are displayed, it is possible to, for example, extract a plurality of image scenes with a relatively long replay time from a single moving image and to display a scene image of each of the image scenes. Further, it is possible to display a group of scene images categorized according to type so that the group of scene images may be easily recognized.

For example, a group of scene images may be arranged on one plane at random, while a group of scene images may be arranged on the other plane in time series or according to mood. Further, each group of scene images belonging to a different period may be displayed on each plane or each group of scene images belonging to a different region may be displayed on each plane. Also in this case, if an object is selected, a scene image of a scene where a character corresponding to the selected object appears is highlighted. Accordingly, based on the distribution of highlighted scene images, it is possible to visually recognize a variety of information, such as the period, region, or role of the activity of the character.

(1-6-2: Display of Related Information)

Figure 33:
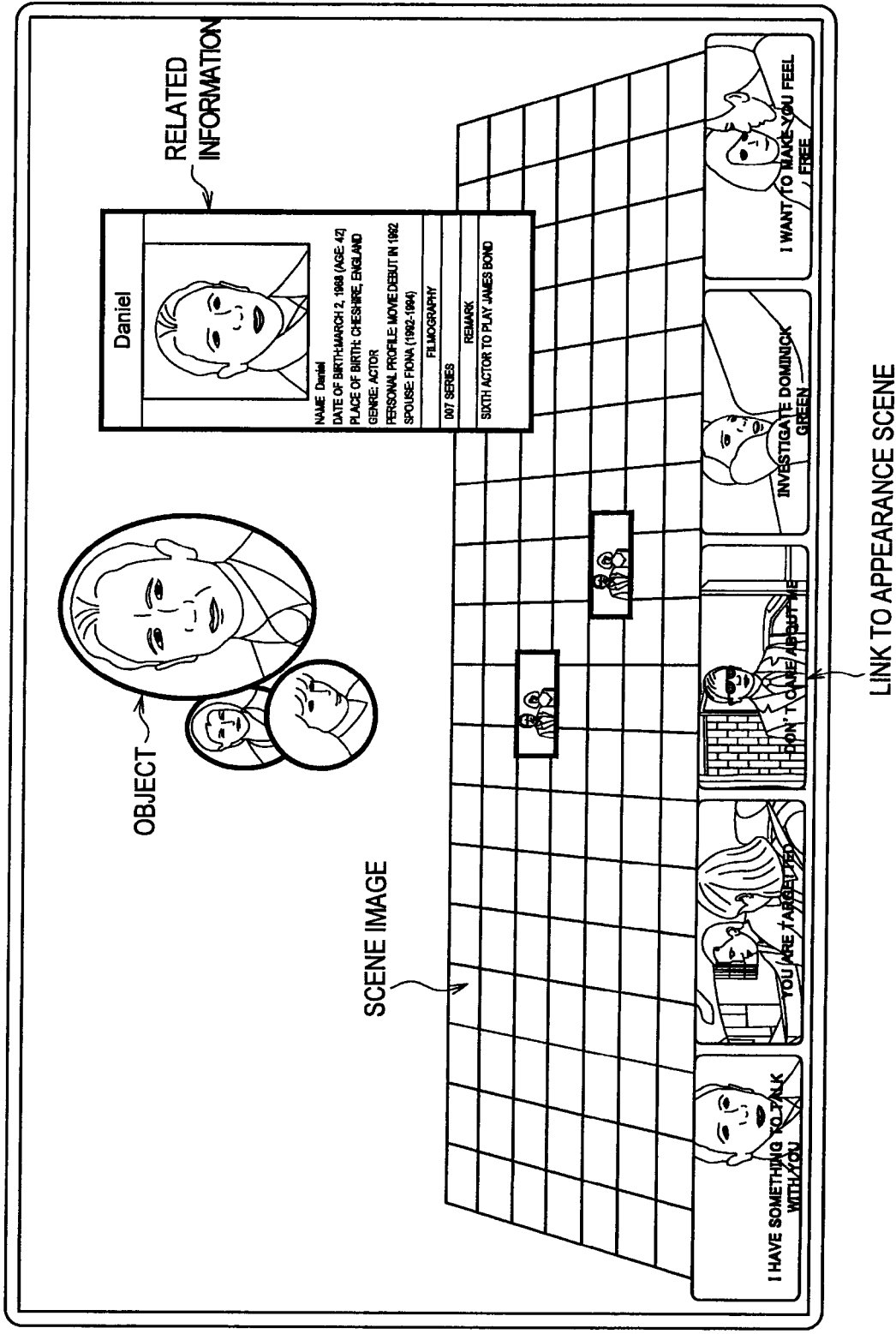
FIG. 33 is a view illustrating a method of displaying an object, a method of displaying a scene image, and a method of displaying related information according to an exemplary embodiment of the present disclosure.

Although the method of displaying objects and scene images has mainly been described, information related to a character may be displayed using object metadata as shown in FIG. 33. For example, if an object is selected by a user, related information corresponding to a character corresponding to the selected object may be displayed using the object metadata.

Further, using the segment metadata as well as the object metadata, appearance scenes of a character corresponding to selected objects may be extracted and images of the appearance scenes may be displayed side by side as shown in FIG. 33. If one of the images displayed side by side is selected, an image scene corresponding to the selected image may be replayed. Further, using the segment metadata, it is possible to detect image scenes where characters corresponding to a plurality of objects simultaneously selected by a user are commonly appearing. In addition, it is possible to display images of the detected common appearance scenes side by side or highlight scene images corresponding to the common appearance scenes. Information on the common appearance works may be displayed as related information.

(1-6-3: Display of a Moving Image Replay Screen)

Figure 34:
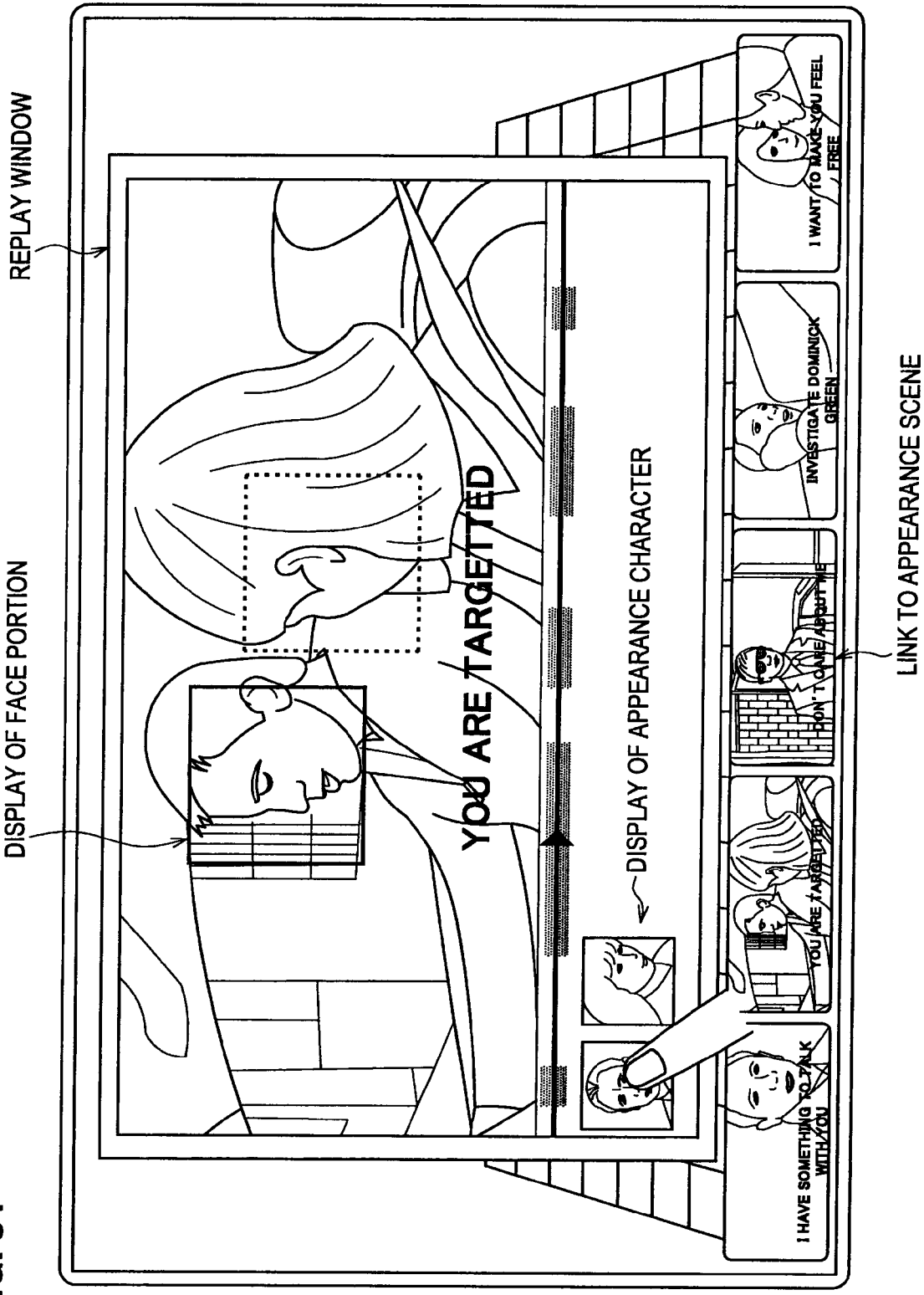
FIG. 34 is a view illustrating a method of displaying a replay window according to an exemplary embodiment of the present disclosure.

Mechanism of replaying the entire moving image or a part of image scenes in response to the selection of objects, scene images or images of image scenes has been described above. Next, an example of configuring of a moving image replay screen will be described with reference to FIG. 34. For example, as shown in FIG. 34, a method of displaying a replay screen of a moving image in a replay window may be considered. Further, a face portion of a character appearing in the replay screen or an image of the character's thumb may be displayed. In addition, if the thumb image is selected, a segment where the character corresponding to the thumb image appears may be displayed.

Further, in response to the selection of the face portion or the thumb image, only an image scene of a segment where a character corresponding to the selected face portion or thumb image appears may be selectively replayed. As described above, the segment metadata includes information on segments of a moving image where each character appears. Accordingly, only segments where a particular character appears may be selectively replayed using the segment metadata. Further, common appearance scenes where a particular group of characters commonly appears may be detected using the segment metadata. Accordingly, if a plurality of characters are selected, only common appearance scenes where the characters commonly appear may be selectively replayed using the segment metadata.

Ideas for the display method have been described above.

As described above, by using the techniques related to the present embodiments, it is possible to implement a user interface configured for a user to easily recognize the relation between characters. Further, it is possible to implement a user interface configured for a user to easily recognize the relation between a character and an image scene or the activity of a character.

The type of moving images or the type of input devices has not been described above. However, for example, the following moving images or input devices may be included. Examples of the type of moving images may include recorded image content, image content provided from recorded media, televised image content, or image content stream transmitted through a network. Examples of the type of input devices may include a mouse, a keyboard, a remote control, a touch pad, and a touch panel.

A method of selecting a group of moving images of interest has not been described above. However, for example, a group of moving images of interest may be selected by the following method. For example, a method of selecting a group of moving images related to a character with a user's favorite character name which is input by the user may be considered. An example of a group of moving images related to a character may be a group of moving images including moving images where the character appears and other moving images where another character commonly appearing in the moving images appears. Further, if a user's browsing history is recorded, the user's favorite character may be determined using the browsing history and a group of moving images related to the character may be selected.

Further, only an object corresponding to a user's favorite character and an object of another character related to the character may be displayed, or the objects may be displayed in the center of a screen. In this case, the favorite character may be based on the input of the user, or may be determined using the user's browsing history. Further, a first object which is displayed at the very first may become an object corresponding to the user's favorite character. In addition, when a group of scene images is displayed according to region, a group of scene images for a region nearest to another region where a user resides may be displayed in the center of a screen, or a map on the region may be displayed in close-up. Any modified example of such an example may be within the technical scope of the present embodiment.

2: Hardware Structure

A function of each element of the information processing apparatus 100 may be implemented using, for example, a hardware structure shown in FIG. 35. That is, the function of each element is implemented by controlling hardware shown in FIG. 35 using computer programs. This hardware is illustrative only. Examples of the hardware may include a portable information terminal, such as a personal computer, a mobile phone, a PHS, or a PDS, a game machine, or a variety of information appliances. PHS is an acronym for personal handyphone system, and PDS is an acronym for personal digital assistant.

As shown in FIG. 35, the hardware mainly includes a CPU 902, a ROM 904, a RAM 906, a host bus 908, and a bridge 910. The hardware further includes an external bus 912, an interface 914, an input part 916, an output part 918, a storage part 920, a drive 922, a connection port 924, and a communication part 926. CPU is an acronym for central processing unit. ROM is an acronym for read-only memory. RAM is an acronym for random access memory.

The CPU 902 serves, for example, as an operation processing device or a control device. The CPU 902 generally or partly controls each element based on a variety of programs recorded on the ROM 904, the RAM 906, the storage 920, or a removable recording medium 928. The ROM 904 is configured to store programs read by the CPU 902 or data used in operations. The RAM 906 is configured to temporarily or permanently store, for example, programs read by the CPU 902 or a variety of parameters changed accordingly when the programs are executed.

The elements are interconnected through, for example, the host bus 908 through which high-rate data transmission is performed. The host bus 908 is connected through the bridge 910 to, for example, the external bus 912 through which a relatively low-rate data transmission is performed. Examples of the input part 916 may include a mouse, a keyboard, a touch panel, a button, a switch and a lever. Further, another example of the input part 916 is a remote control configured to transmit a control signal through an infrared ray or other radio waves.

Examples of the output part 918 may include a display device, such as a CRT, a LCD, a PDP, or an ELD, an audio device, such as a speaker or a headphone, or a device, such as a printer, a mobile phone, or a facsimile, to visually or audibly provide acquired information to a user. CRT is an acronym for cathode ray tube. LCD is an acronym for liquid crystal display. PDP is an acronym for plasma display panel. ELD is an acronym for electroluminescence display.

The storage part 920 is configured to store a variety of data. Examples of the storage part 920 may include a magnetic storage device, such as hard disk drive, a semiconductor storage device, an optical storage device, or a magneto-optical storage device. HDD is an acronym for hard disk drive.

The drive 922 is configured to read information from the removable recording medium 928, such as a magnetic disk, an optical disk, a magneto-optical disk, or a semiconductor memory, and writes information into the removable recording medium 928. Examples of the removable recording medium 928 may include a DVD medium, a Blu-ray medium, an HD DVD medium, and a variety of semiconductor storage media. The removable recording medium 928 may be, for example, an IC card equipped with a non-contact IC tip, or an electronic device. IC is an acronym for integrated circuit.

The connection port 924 is a port configured to connect to an external connection device 930, such as a USB port, an IEEE1394 port, a SCSI port, a RS232C port, or an optical audio terminal. Examples of the external connection device 930 may include a printer, a portable music player, a digital camera, a digital video camera, or an IC recorder. USB is an acronym for universal serial bus, and SCSI is an acronym for small computer system interface.

The communication part 926 is a communication device configured to connect to a network 932. Examples of the communication part 926 may include a wired or wireless LAN, Bluetooth (registered trademark), a communication card for WUSB, a router for optical communication, a router for ADSL, or a modem for a variety of communications. The network 932 connected to the communication part 926 is a wired or wireless network. Examples of the network 932 may include Internet, home LAN, infrared communication, visible-ray communication, broadcasting, or satellite communication. LAN is an acronym for local area network. WUSB is an acronym for wireless USB. ADSL is an acronym for asymmetric digital subscriber line.

3: Review

Finally, the technical ideas for the present embodiments will be briefly reviewed. The following technical ideas may be applied to a variety of information processing apparatuses, such as PCs, mobile phones, portable game machines, portable information terminals, information appliances, television sets, recording replay devices, set-top box, or car navigation systems. In particular, the following technical ideas may be applied to functions of display apparatuses included in the above-mentioned information processing apparatuses.

The display apparatus described in the following item (1) may extract a common appearance relation of characters appearing in a moving image using segment metadata. For example, it is possible to extract information on common appearance, the number of common appearance works, and the length of common appearance scenes, and other information on common appearance relations using segment metadata of a character A and segment metadata of a character B. Accordingly, it is possible to calculate a relation score indicating the closeness of a relation between the character A and the character B from the above-mentioned information. Further, by controlling the arrangement of objects corresponding to characters according to the calculated relation score when each of the objects corresponding to each of characters is displayed, it is possible to easily present a user with a relation between the characters. In other words, the user may visually recognize the closeness of the relation between the characters based on the common appearance relation in a moving image.

(1)

A display apparatus including: a relation score calculation unit calculating a relation score indicating closeness of a relation between characters based on a common appearance relation using segment metadata indicating a segment in a moving image where each of the characters appears; and an object display unit displaying an object corresponding to each of the characters appearing in the moving image, wherein the object display unit displays a pair of objects corresponding to a pair of characters with a high relation score to be closely positioned to each other, and displays a pair of objects corresponding to a pair of characters with a low relation score to be positioned far from each other.

(2)

The display apparatus according to the item (1), further including an appearance time calculation unit calculating a total appearance time indicating a sum of appearance time of each of the characters appearing in the moving image using the segment metadata, wherein the object display unit displays an object corresponding to a character with a long appearance time to have a large size, and displays an object corresponding to a character with a short appearance time to have a small size.

(3)

The display apparatus according to the item (1) or (2), wherein the relation score calculation unit calculates a number of common appearance works using the segment metadata and outputs the number of common appearance works as the relation score for each pair of characters.

(4)

The display apparatus according to the item (1) or (2), wherein the relation score calculation unit outputs a sum of a first value, a second value and a third value as the relation score using the segment metadata for each pair of characters, the first value being a number of common appearance works where both of characters play a leading role, which is multiplied by a first weight, the second value being a number of common appearance works where one character plays a leading role and the other character plays a supporting role, which is multiplied by a second weight, and the third value being a number of common appearance works where both of characters play a supporting role, which is multiplied by a third weight, and wherein the first weight is greater than the second weight, and the second weight is greater than the third weight.

(5)

The display apparatus according to the item (2), wherein the relation score calculation unit calculates a product of appearance time of one character and appearance time of another character using the segment metadata for each pair of characters appearing in each common appearance work, obtains a sum of the calculated products for every common appearance work, and outputs the sum of the calculated products as the relation score.

(6)

The display apparatus according to the item (1) or (2), wherein the relation score calculation unit calculates a sum of appearance time of both characters appearing in the same moving image frame using the segment metadata and outputs the sum of appearance time as the relation score for each pair of characters.

(7)

The display apparatus according to the item (1) or (2), wherein the relation score calculation unit outputs a sum of a first value, a second value and a third value as the relation score using the segment metadata for each pair of characters, the first value being a sum of appearance time of both of characters playing a leading role in a moving image frame, which is multiplied by a first weight, the second value being a sum of appearance time of one character playing a leading role and appearance time of the other character playing a supporting role, which is multiplied by a second weight, and the third value being a sum of appearance time of both of characters playing a supporting role, which is multiplied by a third weight.

(8)

The display apparatus according to the item (2), wherein the relation score calculation unit calculates a product of appearance time of one character multiplied by appearance time of another character and a sum of appearance time of both of the characters appearing in the same moving image frame using the segment metadata for each pair of characters appearing in each common appearance work, obtains a sum of the calculated products for every common appearance work, and outputs the sum of the calculated products as the relation score.

(9)

The display apparatus according to any one of the items (1) to (8), wherein the object display unit displays every object so that a potential function may have a minimum value, the potential function including a first function of a position of an object within a display area and a second function of a positional relation between objects, wherein the first function has a large value as the position of an object becomes close to the display area, wherein the second function decreases in value as two objects corresponding to a pair of related characters become close to a distance corresponding to a relation score corresponding to the pair of related characters, and increases in value as two objects corresponding to a pair of unrelated characters become close to each other, and wherein the distance corresponding to the relation score decreases as the relation score increases.

(10)

The display apparatus according to the item (1), further including a scene display unit displaying an image indicating a scene of a moving image in a tiled manner, wherein when an object is selected by a user, the scene display unit highlights an image indicating a scene of a moving image where a character corresponding to the selected object appears.

(11)
The display apparatus according to the item (10), wherein the scene display unit randomly selects a scene from a moving image and displays an image indicating the selected scene at a random position.

(12)
The display apparatus according to the item (10), wherein the scene display unit displays images extracted from a moving image to be arranged in a column, and wherein the images are arranged in column direction in order of earlier appearance time in each of moving images while the moving images from each of which images are extracted are arranged in an older order in row direction.

(13)
The display apparatus according to the item (10), wherein the scene display unit displays an image indicating a scene of the moving image so that scenes with the same mood may be arranged in the same column.

(14)
The display apparatus according to the item (10), wherein when the image is selected by a user, the object display unit displays an object corresponding only to a character appearing in a moving image corresponding to the image.

(15)
The display apparatus according to the item (1), wherein the object display unit indicates a line interconnecting two objects corresponding to a pair of related characters.

(16)
The display apparatus according to the item (1), further including a moving image replay unit extracting, when the object is selected by a user, a segment where a character corresponding to the selected object appears using the segment metadata, and replaying a moving image frame in the extracted segment.

(17)
The display apparatus according to the item (1), wherein when the object is selected by a user, the object display unit moves every object corresponding to characters related to a character corresponding to the selected object in the same phase.

(18)
A method of displaying an object, the method including: calculating a relation score indicating closeness of a relation between characters based on a common appearance relation using segment metadata indicating a segment in a moving image where each of the characters appears; and displaying an object corresponding to each of the characters appearing in the moving image, wherein a pair of objects corresponding to a pair of characters with a high relation score is displayed to be closely positioned to each other, and a pair of objects corresponding to a pair of characters with a low relation score is displayed to be positioned far from each other.

(19)
A program for causing a computer to realize a function of calculating a relation score indicating closeness of a relation between characters based on a common appearance relation using segment metadata indicating a segment in a moving image where each of the characters appears, and a function of displaying an object corresponding to each of the characters appearing in the moving image, wherein the function of display an object includes displaying a pair of objects corresponding to a pair of characters with a high relation score to be closely positioned to each other, and displaying a pair of objects corresponding to a pair of characters with a low relation score to be positioned far from each other.

(Remark)
The information processing apparatus 100 is an example of a display apparatus. The relation calculation unit 103 is an example of a relation score calculation unit. The appearance time calculation unit 102 is an example of an appearance time calculation unit. The scene image display unit 107 is an example of a scene display unit. The replay control unit 109 is an example of a moving image replay unit.

It should be understood by those skilled in the art that various modifications, combinations, sub-combinations and alterations may occur depending on design requirements and other factors insofar as they are within the scope of the appended claims or the equivalents thereof.

For example, the preferred embodiments of the present disclosure have mainly described a method of displaying the relation between characters and a method of displaying an object corresponding to a character. However, the embodiments are not limited to the characters. For example, a relation between an article and a character appearing in a moving image may be likewise evaluated; thus, it is possible to display an object corresponding to the article. For example, a suit S which a character A enjoys wearing may be recognized using the above-mentioned techniques, or it may be visually displayed how often the character A enjoys wearing the suit S.

Here, visually represented is a relation between the character A and the suit S which can be obtained from the analysis of a moving image. Accordingly, for example, when a television image is to be analyzed, the suit S that the character A enjoys wearing may be extracted as an article, as described above. For example, a user who is very interested in the character A may use the above-mentioned technique to easily recognize articles that the character A enjoys wearing.

Likewise, it is possible to extract a relation between articles or to visually represent the relation. For example, it is possible to visually represent a dress D which is highly related to the suit S that the character A frequently wears (for example, if the dress D and the suit S frequently appear in the same scene). That is, using the above-mentioned technique, it is possible to easily recognize a sensible combination of a suit and a dress which appear in a scene of a movie. In addition to the attire, it is possible to easily recognize clothes or glasses that go with a car, or places, such as sea or woods, that harmonize with a car with a color.

It should be understood that the above-mentioned application examples are also within the scope of the embodiments of the present disclosure.

The present disclosure contains subject matter related to that disclosed in Japanese Priority Patent Application JP 2011-127390 filed in the Japan Patent Office on Jun. 7, 2011, the entire content of which is hereby incorporated by reference.

What is claimed is:
1. A display apparatus comprising:
a relation score calculation unit configured to calculate a relation score indicating closeness of a relation between characters based on a common appearance relation using segment metadata indicating a segment in a moving image where each of the characters appears; and
an object display unit configured to display an object corresponding to each of the characters appearing in the moving image,
wherein the object display unit displays a pair of objects corresponding to a pair of characters with a high relation score to be closely positioned to each other, and displays a pair of objects corresponding to a pair of characters with a low relation score to be positioned far from each other, wherein the relation score calculation unit outputs a sum of a first value, a second value and a third value as the relation score using the segment metadata for each pair of characters, the first value being a number of common appearance works where both of characters play a leading role, which is multiplied by a first weight, the second value being a number of common appearance works where one character plays a leading role and the other character plays a supporting role, which is multiplied by a second weight, and the third value being a number of common appearance works where both of characters play a supporting role, which is multiplied by a third weight, wherein the first weight is greater than the second weight, and the second weight is greater than the third weight, and wherein at least one of the relation score calculation unit and the object display unit is implemented via a processor.

2. The display apparatus according to claim 1, further comprising:

an appearance time calculation unit configured to calculate a total appearance time indicating a sum of appearance time of each of the characters appearing in the moving image using the segment metadata, wherein the object display unit displays an object corresponding to a character with a long appearance time to have a large size, and displays an object corresponding to a character with a short appearance time to have a small size, and wherein the appearance time calculation unit is implemented via a processor.

3. The display apparatus according to claim 1, wherein the relation score calculation unit calculates a number of common appearance works using the segment metadata and outputs the number of common appearance works as the relation score for each pair of characters.

4. The display apparatus according to claim 2, wherein the relation score calculation unit calculates a product of appearance time of one character and appearance time of another character using the segment metadata for each pair of characters appearing in each common appearance work, obtains a sum of the calculated products for every common appearance work, and outputs the sum of the calculated products as the relation score.

5. The display apparatus according to claim 1, wherein the relation score calculation unit calculates a sum of appearance time of both characters appearing in the same moving image frame using the segment metadata and outputs the sum of appearance time as the relation score for each pair of characters.

6. A display apparatus comprising:

a relation score calculation unit configured to calculate a relation score indicating closeness of a relation between characters based on a common appearance relation using segment metadata indicating a segment in a moving image where each of the characters appears; and an object display unit configured to display an object corresponding to each of the characters appearing in the moving image, wherein the object display unit displays a pair of objects corresponding to a pair of characters with a high relation score to be closely positioned to each other, and displays a pair of objects corresponding to a pair of characters with a low relation score to be positioned far from each other, wherein the relation score calculation unit outputs a sum of a first value, a second value and a third value as the relation score using the segment metadata for each pair of characters, the first value being a sum of appearance time of both of characters playing a leading role in a moving image frame, which is multiplied by a first weight, the second value being a sum of appearance time of one character playing a leading role and appearance time of the other character playing a supporting role, which is multiplied by a second weight, and the third value being a sum of appearance time of both of characters playing a supporting role, which is multiplied by a third weight, and wherein at least one of the relation score calculation unit and the object display unit is implemented via a processor.

7. A display apparatus according comprising:

a relation score calculation unit configured to calculate a relation score indicating closeness of a relation between characters based on a common appearance relation using segment metadata indicating a segment in a moving image where each of the characters appears;

an object display unit configured to display an object corresponding to each of the characters appearing in the moving image; and an appearance time calculation unit configured to calculate a total appearance time indicating a sum of appearance time of each of the characters appearing in the moving image using the segment metadata, wherein the object display unit displays a pair of objects corresponding to a pair of characters with a high relation score to be closely positioned to each other, displays a pair of objects corresponding to a pair of characters with a low relation score to be positioned far from each other, displays an object corresponding to a character with a long appearance time to have a large size, and displays an object corresponding to a character with a short appearance time to have a small size, wherein the relation score calculation unit calculates a product of appearance time of one character multiplied by appearance time of another character and a sum of appearance time of both of the characters appearing in the same moving image frame using the segment metadata for each pair of characters appearing in each common appearance work, obtains a sum of the calculated products for every common appearance work, and outputs the sum of the calculated products as the relation score, and wherein at least one of the relation score calculation unit, the object display unit and the appearance time calculation unit is implemented via a processor.

8. A display apparatus comprising:

a relation score calculation unit configured to calculate a relation score indicating closeness of a relation between characters based on a common appearance relation using segment metadata indicating a segment in a moving image where each of the characters appears; and an object display unit configured to display an object corresponding to each of the characters appearing in the moving image, wherein the object display unit displays a pair of objects corresponding to a pair of characters with a high relation score to be closely positioned to each other, and displays a pair of objects corresponding to a pair of characters with a low relation score to be positioned far from each other, wherein the object display unit displays every object so that a potential function may have a minimum value, the potential function including a first function of a position of an object within a display area and a second function of a positional relation between objects, wherein the first function has a large value as the position of an object becomes close to the display area, wherein the second function decreases in value as two objects corresponding to a pair of related characters become close to a distance corresponding to a relation score corresponding to the pair of related characters, and increases in value as two objects corresponding to a pair of unrelated characters become close to each other, wherein the distance corresponding to the relation score decreases as the relation score increases, and wherein at least one of the relation score calculation unit and the object display unit is implemented via a processor.

9. The display apparatus according to claim 1, further comprising:

a scene display unit configured to display an image indicating a scene of a moving image in a tiled manner, wherein when an object is selected by a user, the scene display unit highlights an image indicating a scene of a moving image where a character corresponding to the selected object appears, and wherein the scene display unit is implemented via a processor.

10. The display apparatus according to claim 9, wherein the scene display unit randomly selects a scene from a moving image and displays an image indicating the selected scene at a random position.

11. The display apparatus according to claim 9, wherein the scene display unit displays images extracted from a moving image to be arranged in a column, and wherein the images are arranged in column direction in order of earlier appearance time in each of moving images while the moving images from each of which images are extracted are arranged in an older order in row direction.

12. The display apparatus according to claim 9, wherein the scene display unit displays an image indicating a scene of the moving image so that scenes with the same mood may be arranged in the same column.

13. The display apparatus according to claim 9, wherein when the image is selected by a user, the object display unit displays an object corresponding only to a character appearing in a moving image corresponding to the image.

14. The display apparatus according to claim 1, wherein the object display unit indicates a line interconnecting two objects corresponding to a pair of related characters.

15. The display apparatus according to claim 1, further comprising:

a moving image replay unit configured to extract, when the object is selected by a user, a segment where a character corresponding to the selected object appears using the segment metadata, and replaying a moving image frame in the extracted segment, wherein the moving image replay unit is implemented via a processor.

16. The display apparatus according to claim 1, wherein when the object is selected by a user, the object display unit moves every object corresponding to characters related to a character corresponding to the selected object in the same phase.

17. A method of displaying an object, the method comprising:

calculating, by a processor of a device, a relation score indicating closeness of a relation between characters based on a common appearance relation using segment metadata indicating a segment in a moving image where each of the characters appears; and displaying, by control of the processor, an object corresponding to each of the characters appearing in the moving image, wherein a pair of objects corresponding to a pair of characters with a high relation score is displayed to be closely positioned to each other, and a pair of objects corresponding to a pair of characters with a low relation score is displayed to be positioned far from each other, wherein the processor outputs a sum of a first value, a second value and a third value as the relation score using the segment metadata for each pair of characters, the first value being a number of common appearance works where both of characters play a leading role, which is multiplied by a first weight, the second value being a number of common appearance works where one character plays a leading role and the other character plays a supporting role, which is multiplied by a second weight, and the third value being a number of common appearance works where both of characters play a supporting role, which is multiplied by a third weight, and wherein the first weight is greater than the second weight, and the second weight is greater than the third weight.

18. A non-transitory computer-readable medium having embodied thereon a program, which when executed by a computer causes the computer to perform a method, the method comprising:

calculating a relation score indicating closeness of a relation between characters based on a common appearance relation using segment metadata indicating a segment in a moving image where each of the characters appears; and displaying an object corresponding to each of the characters appearing in the moving image, wherein the displaying of the object includes displaying a pair of objects corresponding to a pair of characters with a high relation score to be closely positioned to each other, and displaying a pair of objects corresponding to a pair of characters with a low relation score to be positioned far from each other, wherein the computer outputs a sum of a first value, a second value and a third value as the relation score using the segment metadata for each pair of characters, the first value being a number of common appearance works where both of characters play a leading role, which is multiplied by a first weight, the second value being a number of common appearance works where one character plays a leading role and the other character plays a supporting role, which is multiplied by a second weight, and the third value being a number of common appearance works where both of characters play a supporting role, which is multiplied by a third weight, and wherein the first weight is greater than the second weight, and the second weight is greater than the third weight.

* * * * *